US012775374B2

(12) United States Patent
Zhou et al.

(10) Patent No.: US 12,775,374 B2
(45) Date of Patent: *Oct. 27, 2026

(54) HAND SCALE FACTOR ESTIMATION FROM MOBILE INTERACTIONS

(71) Applicant: Snap Inc., Santa Monica, CA (US)

(72) Inventors: Kai Zhou, Wiener Neudorf (AT); Xinrong Wei, Shanghai (CN); Xiao Li, Bellevue, WA (US); Dunxu Hu, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/348,147

(22) Filed: Oct. 2, 2025

(65) Prior Publication Data

US 2026/0037117 A1 Feb. 5, 2026

Related U.S. Application Data

(63) Continuation of application No. 18/794,934, filed on Aug. 5, 2024, now Pat. No. 12,468,439.

(51) Int. Cl.
*G06F 3/0488* (2022.01)

(52) U.S. Cl.
CPC .................................. *G06F 3/0488* (2013.01)

(58) Field of Classification Search
CPC ..................................................... G06F 3/0488
See application file for complete search history.

(56) References Cited

U.S. PATENT DOCUMENTS 11,023,036 B1 * 6/2021 Atlas ................... G06F 3/04815
2018/0082140 A1 * 3/2018 Ida ...................... G06F 3/04845
2022/0122335 A1 * 4/2022 Robinson .............. G06F 3/0488
2022/0236848 A1 * 7/2022 Mao ...................... G06F 1/1626
2024/0193882 A1 * 6/2024 Spong ..................... G06F 3/017

FOREIGN PATENT DOCUMENTS

CN 116194867 5/2023
CN 116246335 6/2023

OTHER PUBLICATIONS

"International Application Serial No. PCT/US2025/040020, International Search Report mailed Nov. 26, 2025", 3 pgs.
"International Application Serial No. PCT/US2025/040020, Written Opinion mailed Nov. 26, 2025", 7 pgs.
"U.S. Appl. No. 18/794,934, Notice of Allowance mailed Apr. 16, 2025", 9 pgs.
"U.S. Appl. No. 18/794,934, Notice of Allowance mailed Aug. 22, 2025", 8 pgs.

* cited by examiner

*Primary Examiner* — Ryan A Lubit
(74) *Attorney, Agent, or Firm* — Schwegman Lundberg & Woessner, P.A.

(57) ABSTRACT

An XR system is provided that enhances user interaction within extended reality environments through precise hand scale estimation. The XR system is configured to capture tracking data of a user's hand as the user interacts with a mobile device. Concurrently, the XR system captures pose data of itself and uses the tracking data and the pose data to determine a reference line segment. This segment aids in calculating three-dimensional distances between node pairs of the user's hand. By employing these measurements, the XR system effectively calculates a hand scale factor that is used for accurately integrating the user's hands into an XR user interface.

20 Claims, 14 Drawing Sheets

HAND SCALE FACTOR ESTIMATION FROM MOBILE INTERACTIONS

PRIORITY CLAIM

This application is a continuation of U.S. patent application Ser. No. 18/794,934, filed on Aug. 5, 2024, which is hereby incorporated by reference in its entirety.

TECHNICAL FIELD

The present disclosure relates generally to user interfaces and, more particularly, to user interfaces used for extended reality.

BACKGROUND

A head-wearable apparatus can be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus can additionally completely occlude a user's visual field and display a virtual environment through which a user can move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term extended Reality (XR) refers to augmented reality, virtual reality and any of hybrids of these technologies unless the context indicates otherwise.

A user of the head-wearable apparatus can access and use a computer software application to perform various tasks or engage in an activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1A:
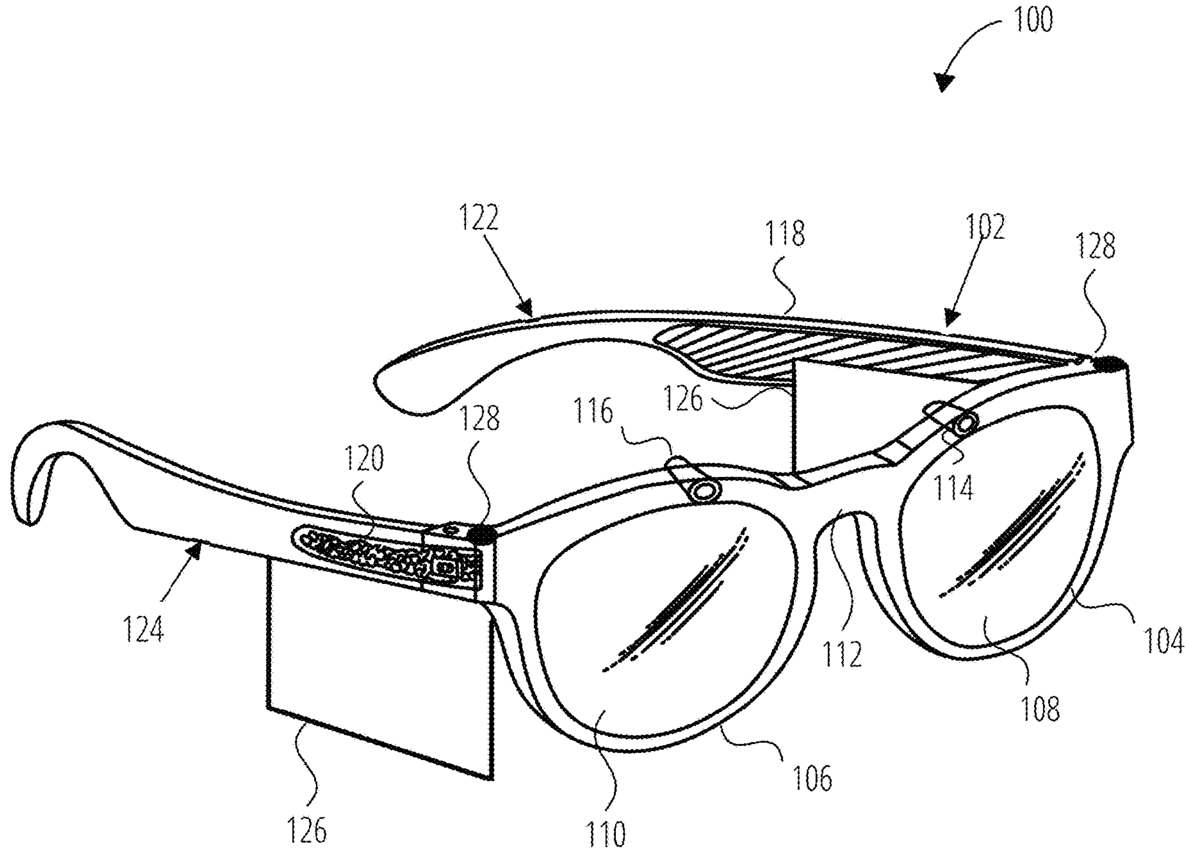
FIG. 1A is a perspective view of a head-wearable apparatus, according to some examples.

Hand-tracking is a way to provide user inputs from a user into an XR user interface provided by an XR system. The XR system tracks one or more of the user's hands using cameras and computer vision methodologies. The XR system determines hand poses or gestures being made by the user using video images captured by the cameras. In some XR systems, the XR user interface includes one or more objects that are manipulated by the user, termed Direct Manipulation of Objects (DMVO). Manipulation of the objects can include operations to rotate an object without also moving the object out of its current position. In some interactions, various virtual objects are created and placed in an XR user interface in a fixed or dynamic relationship to the hands of a user.

Traditional hand-tracking technologies often rely on complex setups involving multiple cameras and sensors that capture an array of data points to model hand movements. These systems can be cumbersome and can not always provide the desired accuracy or user flexibility, particularly in mobile settings where simplicity and ease of use are desirable.

Moreover, a challenge in hand tracking is the issue of scale ambiguity. This arises because the same visual cues can represent different actual hand sizes depending on the distance and angle of the hand relative to the sensors. For instance, a smaller hand closer to the camera can appear similar in size to a larger hand that is further away. Resolving this ambiguity is useful for accurately rendering hands in XR environments, where scale can affect interaction quality.

An XR system in accordance with the methodologies described herein leverages a user's interaction with a mobile device during a setup process for a the XR system equipped with cameras and inertial motion sensors to facilitate initial calibration and ongoing adjustment of hand scale estimations. By guiding users through specific gestures on the mobile device during a setup or calibration phase, the XR system can derive accurate scale measurements that enhance the overall hand-tracking process.

The methodologies described herein simplify the calibration process by utilizing existing hardware which enhances the portability and accessibility of XR systems. It allows for more natural user interactions by accurately scaling virtual hand representations to match the user's actual hand size, thus improving the precision of gesture-based controls and interactions within both virtual and augmented reality environments.

In some examples, the XR system captures tracking data of a user's hand as the user interacts with a touch surface of a mobile device and captures pose data of the XR system itself. Using these data, the XR system determines a reference line segment, calculates three-dimensional distances between node pairs of the hand, and calculates a hand scale factor using these distances.

In some examples, the XR system uses the calculated hand scale factor to determine a scale of a virtual object associated with the hand of the user, thus improving the accuracy and responsiveness of virtual interactions.

In some examples, the touch surface of the mobile device includes markers to facilitate the calculation of the reference line segment by the XR system, thus enhancing the precision of the data captured and processed.

In some examples, the XR system's process of determining three-dimensional distances between node pairs of the hand includes using a default set of values for node pair distances and adjusting these values based on the reference line segment calculated from the tracking and pose data.

In some examples, the XR system uses the calculated hand scale factor to predict a three-dimensional hand skeleton for subsequent semantic event detection, thereby improving the interaction capabilities of the XR system by accurately interpreting user gestures.

In some examples, the XR system synchronizes the capturing of tracking data with the capturing of pose data, ensuring that the data used for calculating the hand scale factor is temporally aligned and accurate.

In some examples, the XR system comprises a head-wearable apparatus, integrating the described functionalities into a portable and user-friendly device suitable for XR applications.

Other technical features can be readily apparent to one skilled in the art from the following figures, descriptions, and claims.

FIG. 1A is a perspective view of a head-wearable apparatus 100 according to some examples. The head-wearable apparatus 100 can be a client device of an XR system, such as a computing system 902 of FIG. 9. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 226, high-speed circuitry 228, and a display processor. Various other examples can include these elements in different configurations or integrated together in different ways. Additional details of aspects of the computer 120 can be implemented as illustrated by the machine 300 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking image data for use by the head-wearable apparatus 100 to extract 3D information from a real-world scene.

The head-wearable apparatus 100 can also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input can be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
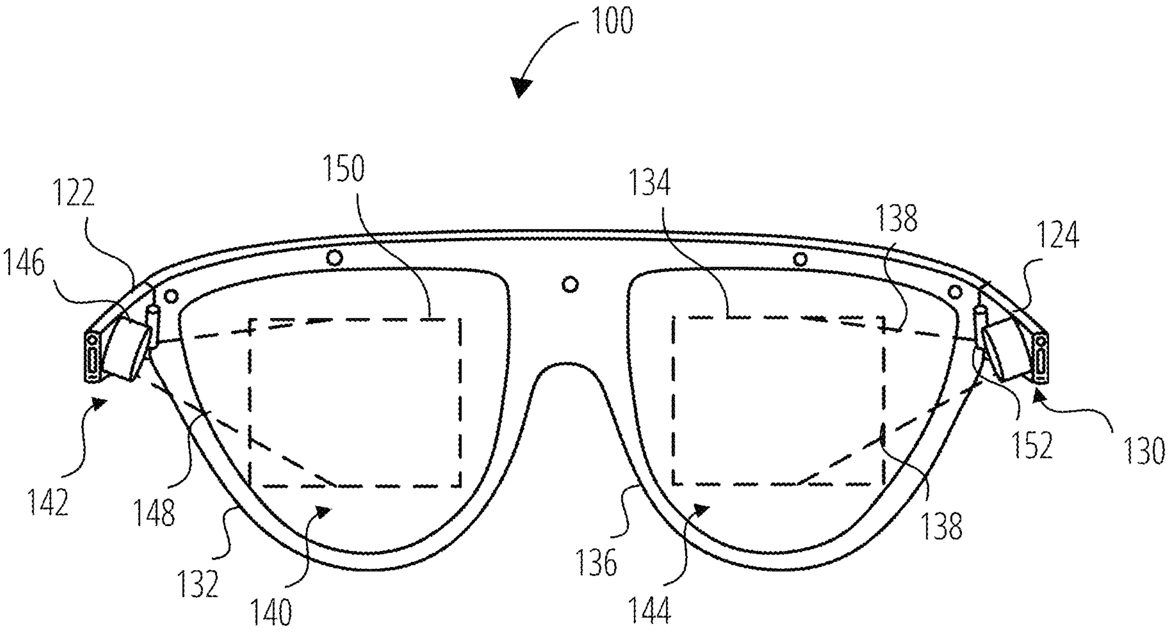
FIG. 1B illustrates a further view of the head-wearable apparatus of FIG. 1A, according to some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations can be utilized within an optical engine to display an image to a user in the user's field of view. For example, instead of a projector and a waveguide, an LCD, LED or other display panel or surface can be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 214 illustrated in FIG. 2), and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

System with Head-Wearable Apparatus

Figure 2:
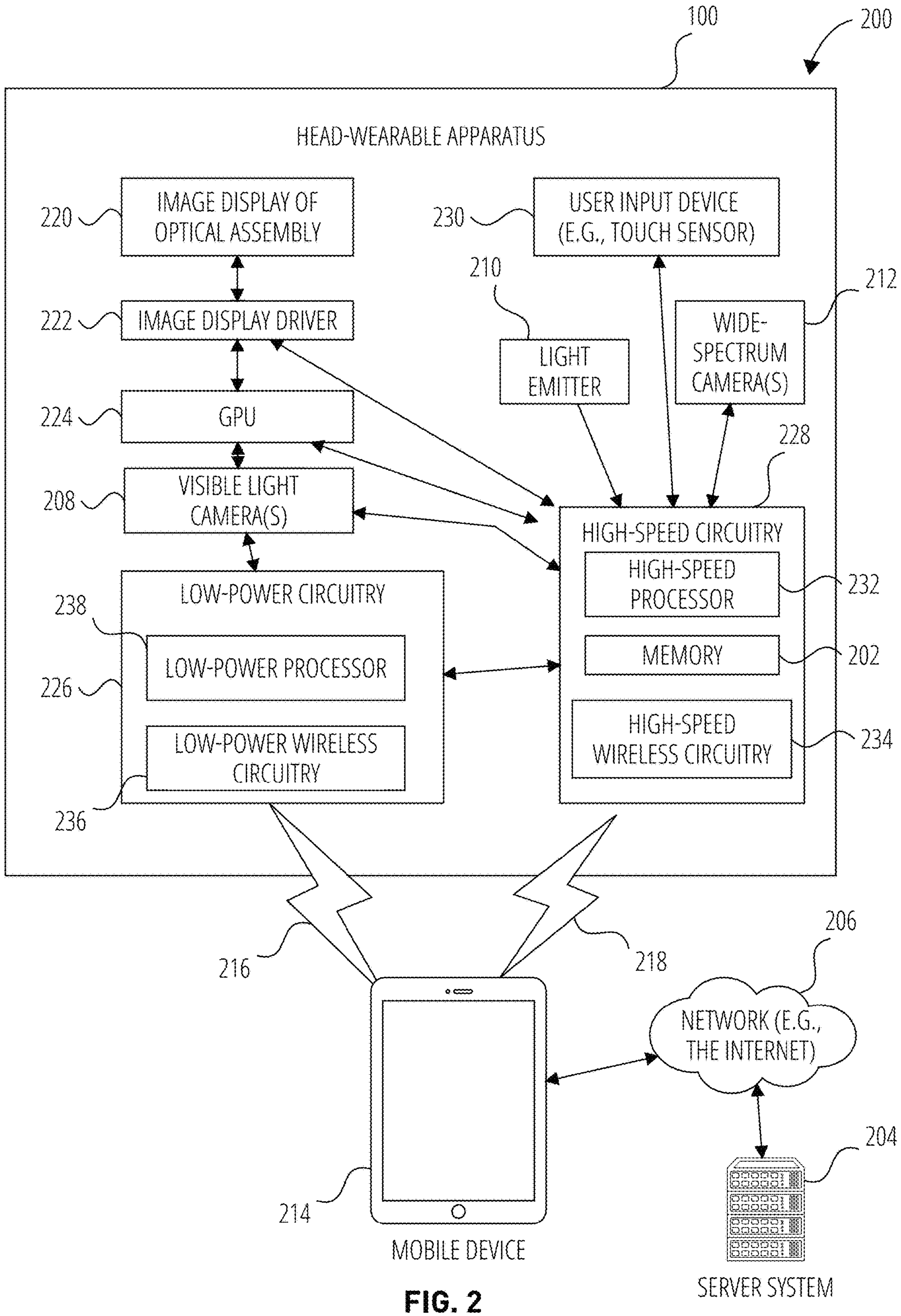
FIG. 2 illustrates a system of a head-wearable apparatus, according to some examples.

FIG. 2 illustrates a system 200 including a head-wearable apparatus 100 with a selector input device, according to some examples. FIG. 2 is a high-level functional block diagram of an example head-wearable apparatus 100 communicatively coupled to a mobile device 214 and various server systems 204 (e.g., the interaction server system 910) via various networks 908.

The head-wearable apparatus 100 includes one or more cameras, each of which can be, for example, one or more camera 208, a light emitter 210, and one or more wide-spectrum cameras 212.

The mobile device 214 connects with head-wearable apparatus 100 using both a low-power wireless connection 216 and a high-speed wireless connection 218. In some examples, the mobile device 214 is also operable to connect to the server system 204 and the network 206.

The head-wearable apparatus 100 further includes two image displays of the image display of optical assembly 220. The two image displays of optical assembly 220 include one associated with the left lateral side and one associated with the right lateral side of the head-wearable apparatus 100. The head-wearable apparatus 100 also includes an image display driver 222, and a GPU 224. The image display of optical assembly 220, image display driver 222, and GPU 224 constitute an optical engine of the head-wearable apparatus 100. The image display of optical assembly 220 is for presenting images and videos, including an image that can include a graphical user interface to a user of the head-wearable apparatus 100.

The image display driver 222 commands and controls the image display of optical assembly 220. The image display driver 222 can deliver image data directly to the image display of optical assembly 220 for presentation or can convert the image data into a signal or data format suitable for delivery to the image display device. For example, the image data can be video data formatted according to compression formats, such as H.264 (MPEG-4 Part 10), HEVC, Theora, Dirac, RealVideo RV40, VP8, VP9, or the like, and still image data can be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 230 (e.g., touch sensor or push button), including an input surface on the head-wearable apparatus 100. The user input device 230 (e.g., touch sensor or push button) is to receive from the user an input selection to manipulate the graphical user interface of the presented image.

The components shown in FIG. 2 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right cameras 208 can include digital camera elements such as a complementary metal oxide-semiconductor (CMOS) image sensor, charge-coupled device, camera lenses, or any other respective visible or light-capturing elements that can be used to capture data, including images of scenes with unknown objects.

The head-wearable apparatus 100 includes a memory 202, which stores instructions to perform a subset or all of the functions described herein. The memory 202 can also include storage device.

As shown in FIG. 2, the high-speed circuitry 228 includes a high-speed processor 232, a memory 202, and high-speed wireless circuitry 234. In some examples, the image display driver 222 is coupled to the high-speed circuitry 228 and operated by the high-speed processor 232 in order to drive the left and right image displays of the image display of optical assembly 220. The high-speed processor 232 can be any processor capable of managing high-speed communications and operation of any general computing system used for the head-wearable apparatus 100. The high-speed processor 232 includes processing resources used for managing high-speed data transfers on a high-speed wireless connection 218 to a wireless local area network (WLAN) using the high-speed wireless circuitry 234. In some examples, the high-speed processor 232 executes an operating system such as a LINUX operating system or other such operating system of the head-wearable apparatus 100, and the operating system is stored in the memory 202 for execution. In addition to any other responsibilities, the high-speed processor 232 executing a software architecture for the head-wearable apparatus 100 is used to manage data transfers with high-speed wireless circuitry 234. In some examples, the high-speed wireless circuitry 234 is configured to implement Institute of Electrical and Electronic Engineers (IEEE)

802.11 communication standards, also referred to herein as WiFi. In some examples, other high-speed communications standards can be implemented by the high-speed wireless circuitry 234.

The low-power wireless circuitry 236 and the high-speed wireless circuitry 234 of the head-wearable apparatus 100 can include short-range transceivers (Bluetooth™) and wireless wide, local, or wide area network transceivers (e.g., cellular or WiFi). Mobile device 214, including the transceivers communicating via the low-power wireless connection 216 and the high-speed wireless connection 218, can be implemented using details of the architecture of the head-wearable apparatus 100, as can other elements of the network 206.

The memory 202 includes any storage device capable of storing various data and applications, including, among other things, camera data generated by the left and right cameras 208, the wide-spectrum cameras 212, and the GPU 224, as well as images generated for display by the image display driver 222 on the image displays of the image display of optical assembly 220. While the memory 202 is shown as integrated with high-speed circuitry 228, in some examples, the memory 202 can be an independent standalone element of the head-wearable apparatus 100. In some such examples, electrical routing lines can provide a connection through a chip that includes the high-speed processor 232 from the GPU 224 or the low-power processor 238 to the memory 202. In some examples, the high-speed processor 232 can manage addressing of the memory 202 such that the low-power processor 238 will boot the high-speed processor 232 any time that a read or write operation involving memory 202 is needed.

As shown in FIG. 2, the low-power processor 238 or high-speed processor 232 of the head-wearable apparatus 100 can be coupled to the camera (camera 208, light emitter 210, or wide-spectrum cameras 212), the image display driver 222, the user input device 230 (e.g., touch sensor or push button), and the memory 202.

The head-wearable apparatus 100 is connected to a host computer. For example, the head-wearable apparatus 100 is paired with the mobile device 214 via the high-speed wireless connection 218 or connected to the server system 204 via the network 206. The server system 204 can be one or more computing devices as part of a service or network computing system, for example, that includes a processor, a memory, and network communication interface to communicate over the network 206 with the mobile device 214 and the head-wearable apparatus 100.

The mobile device 214 includes a processor and a network communication interface coupled to the processor. The network communication interface allows for communication over the network 206, low-power wireless connection 216, or high-speed wireless connection 218. Mobile device 214 can further store at least portions of the instructions for generating binaural audio content in the mobile device 214's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 222. The output components of the head-wearable apparatus 100 further include acoustic components (e.g., speakers), haptic components (e.g., a vibratory motor), other signal generators, and so forth. The input components of the head-wearable apparatus 100, the mobile device 214, and server system 204, such as the user input device 230, can include alphanumeric input components (e.g., a keyboard, a touch surface configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch surface that provides location and force of touches or touch gestures, or other tactile input components), audio input components (e.g., a microphone), and the like.

The head-wearable apparatus 100 can also include additional peripheral device elements. Such peripheral device elements can include biometric sensors, additional sensors, or display elements integrated with the head-wearable apparatus 100. For example, peripheral device elements can include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude can be derived), orientation sensor components (e.g., magnetometers), and the like. Such positioning system coordinates can also be received over low-power wireless connections 216 and high-speed wireless connection 218 from the mobile device 214 via the low-power wireless circuitry 236 or high-speed wireless circuitry 234.

Machine Architecture

Figure 3:
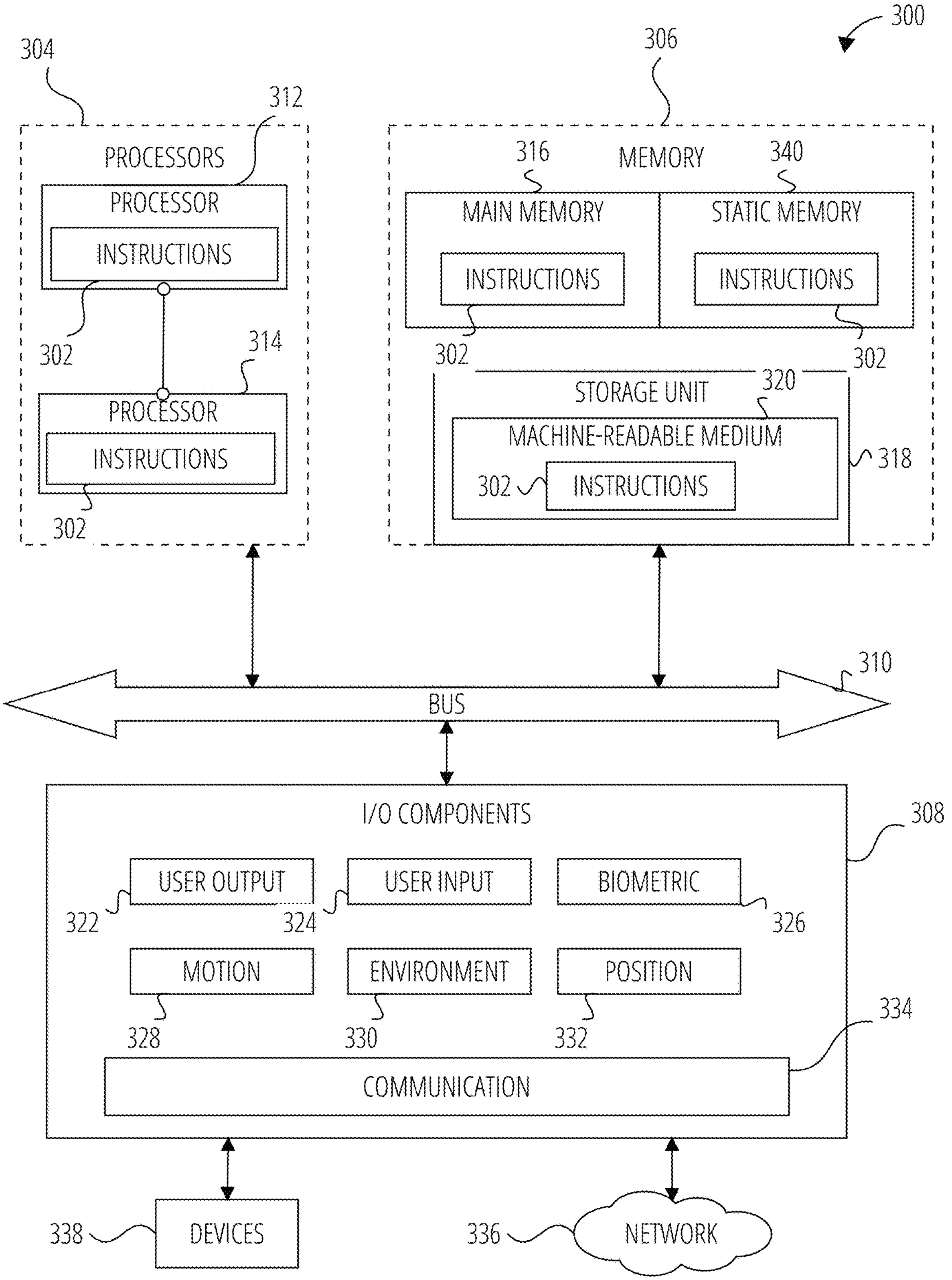
FIG. 3 is a diagrammatic representation of a machine within which a set of instructions can be executed to cause the machine to perform any one or more of the methodologies discussed herein, according to some examples.

FIG. 3 is a diagrammatic representation of the machine 300 within which instructions 302 (e.g., software, a program, an application, an applet, an app, or other executable code) for causing the machine 300 to perform any one or more of the methodologies discussed herein can be executed. For example, the instructions 302 can cause the machine 300 to execute any one or more of the methods described herein. The instructions 302 transform the general, non-programmed machine 300 into a particular machine 300 programmed to carry out the described and illustrated functions in the manner described. The machine 300 can operate as a standalone device or can be coupled (e.g., networked) to other machines. In a networked deployment, the machine 300 can operate in the capacity of a server machine or a client machine in a server-client network environment, or as a peer machine in a peer-to-peer (or distributed) network environment. The machine 300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 302, sequentially or otherwise, that specify actions to be taken by the machine 300. Further, while a single machine 300 is illustrated, the term "machine" shall also be taken to include a collection of machines that individually or jointly execute the instructions 302 to perform any one or more of the methodologies discussed herein. The machine 300, for example, can comprise the computing system 902 or any one of multiple server devices forming part of the interaction server system 910. In some examples, the machine 300 can also comprise both client and server systems, with specified operations of a particular method or algorithm being performed on the server-side and with specified operations of the particular method or algorithm being performed on the client-side.

The machine 300 can include processors 304, memory 306, and input/output I/O components 308, which can be configured to communicate with each other via a bus 310. In an example, the processors 304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, a processor 312 and a processor 314 that execute the instructions 302. The term "processor" is intended to include multi-core processors that can comprise two or more independent processors (sometimes referred to as "cores") that can execute instructions contemporaneously. Although FIG. 3 shows multiple processors 304, the machine 300 can include a single processor with a single-core, a single processor with multiple cores (e.g., a multi-core processor), multiple processors with a single core, multiple processors with multiples cores, or any combination thereof.

The memory 306 includes a main memory 316, a static memory 340, and a storage unit 318, both accessible to the processors 304 via the bus 310. The main memory 306, the static memory 340, and storage unit 318 store the instructions 302 embodying any one or more of the methodologies or functions described herein. The instructions 302 can also reside, completely or partially, within the main memory 316, within the static memory 340, within machine-readable medium 320 within the storage unit 318, within at least one of the processors 304 (e.g., within the processor's cache memory), or any suitable combination thereof, during execution thereof by the machine 300.

The I/O components 308 can include a wide variety of components to receive input, provide output, produce output, transmit information, exchange information, capture measurements, and so on. The specific I/O components 308 that are included in a particular machine will depend on the type of machine. For example, portable machines such as mobile phones can include a touch input device or other such input mechanisms, while a headless server machine will likely not include such a touch input device. It will be appreciated that the I/O components 308 can include many other components that are not shown in FIG. 3. In various examples, the I/O components 308 can include user output components 322 and user input components 324. The user output components 322 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 324 can include alphanumeric input components (e.g., a keyboard, a touch surface configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch surface that provides location and force of touches or touch gestures, or other tactile input components), audio input components (e.g., a microphone), and the like.

In further examples, the I/O components 308 can include biometric components 326, motion components 328, environmental components 330, or position components 332, among a wide array of other components. For example, the biometric components 326 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 328 include acceleration sensor components (e.g., accelerometer), gravitation sensor components, rotation sensor components (e.g., gyroscope).

The environmental components 330 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that can provide indications, measurements, or signals corresponding to a surrounding physical environment.

The position components 332 include location sensor components (e.g., a GPS receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 308 further include communication components 334 operable to couple the machine 300 to a network 336 or devices 338 via respective coupling or connections. For example, the communication components 334 can include a network interface component or another suitable device to interface with the network 336. In further examples, the communication components 334 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 338 can be another machine or any of a wide variety of peripheral devices (e.g., a peripheral device coupled via a USB).

Moreover, the communication components 334 can detect identifiers or include components operable to detect identifiers. For example, the communication components 334 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 334, such as location via Internet Protocol (IP) geolocation, location via Wi-Fi® signal triangulation, location via detecting an NFC beacon signal that can indicate a particular location, and so forth.

The various memories (e.g., main memory 316, static memory 340, and memory of the processors 304) and storage unit 318 can store one or more sets of instructions and data structures (e.g., software) embodying or used by any one or more of the methodologies or functions described herein. These instructions (e.g., the instructions 302), when executed by processors 304, cause various operations to implement the disclosed examples.

The instructions 302 can be transmitted or received over the network 336, using a transmission medium, via a network interface device (e.g., a network interface component included in the communication components 334) and using any one of several well-known transfer protocols (e.g., hypertext transfer protocol (HTTP)). Similarly, the instructions 302 can be transmitted or received using a transmission medium via a coupling (e.g., a peer-to-peer coupling) to the devices 338.

Figure 4:
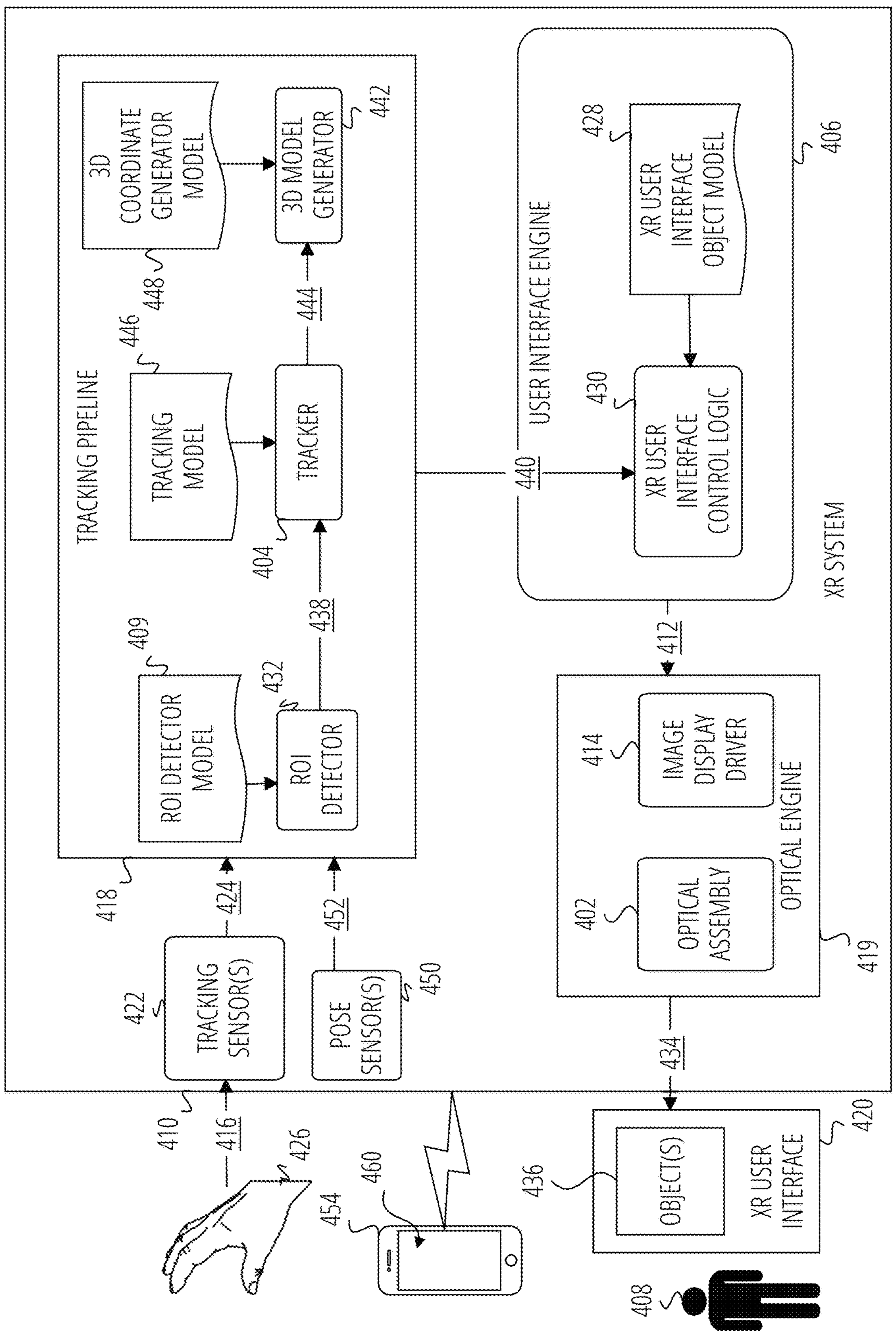
FIG. 4 illustrates a collaboration diagram of components of an XR system using hand-tracking for user input, according to some examples.
Figure 5:
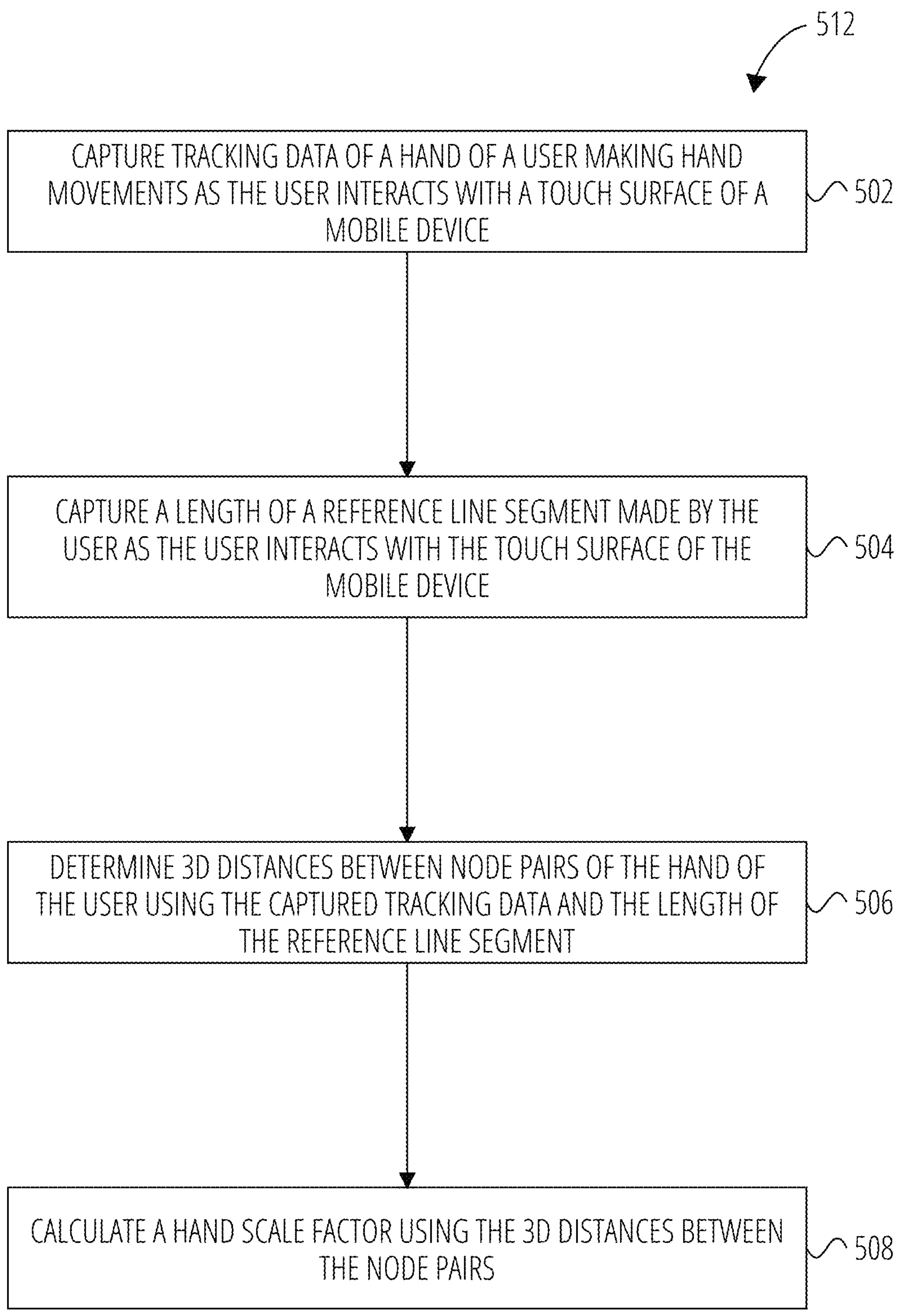
FIG. 5 illustrates a hand size estimation method, according to some examples.

FIG. 4 illustrates a collaboration diagram of components of an XR system 410 using hand-tracking for user input and FIG. 5 illustrates a process flow diagram of a hand size estimation method 512, according to some examples. The XR system 410 uses the hand size estimation method 512 to estimate a hand size of the user 408 during a calibration or setup phase of the XR system 410.

Although a hand size estimation method 512 of FIG. 5 depicts a particular sequence of operations, the sequence can be altered without departing from the scope of the present disclosure. For example, some of the operations depicted can be performed in parallel, in a different sequence, or by different components of an XR system, which does not materially affect the function of the method.

3D tracking data 440 is used by an XR system 410 of FIG. 4, such as head-wearable apparatus 100 of FIG. 1A, to provide a continuous real-time input modality to a user 408 of the XR system 410 where the user 408 interacts with an XR user interface 420 using hand gestures or hand poses being made by the user 408 using one or both of their hands 426. The XR user interface 420 can be for a useful application such as a maintenance guide, an interactive map, an interactive tour guide, a tutorial, or the like. The application can also be an entertainment application such as a video game, an interactive video, or the like.

The XR system 410 generates the XR user interface 420 provided to the user 408 within an XR environment. The XR user interface 420 includes one or more objects 436 that the user 408 can interact with. For example, a user interface engine 406 of FIG. 4 includes XR user interface control logic 430 comprising a dialog script or the like that specifies a user interface dialog implemented by the XR user interface 420. The XR user interface control logic 430 also comprises one or more actions that are to be taken by the XR system 410 based on detecting various dialog events such as user inputs input by the user 408 using the XR user interface 420 and by making hand gestures. The user interface engine 406 further includes an XR user interface object model 428. The XR user interface object model 428 includes 3D coordinate data of the one or more objects 436. The XR user interface object model 428 also includes 3D graphics data of the one or more objects 436. The 3D graphics data is used by an optical engine 419 to generate the XR user interface 420 for display to the user 408.

The user interface engine 406 generates XR user interface data 412 using the XR user interface object model 428. The XR user interface data 412 includes image data of the one or more objects 436 of the XR user interface 420. The user interface engine 406 communicates the XR user interface data 412 to an image display driver 414 of an optical engine 419 of the XR system 410. The image display driver 414 receives the XR user interface data 412 and generates display control signals using the XR user interface data 412. The image display driver 414 uses the display control signals to control the operations of one or more optical assemblies 402 of the optical engine 419. In response to the display control signals, the one or more optical assemblies 402 generate an XR user interface graphics display 434 of the XR user interface 420 that is provided to the user 408 in the XR user interface 420 provided to the user 408.

While in use, the XR system 410 uses one or more tracking sensors 422 to detect and record a position, orientation, and gestures of the hands 426 of the user 408. This can involve capturing the speed and trajectory of hand movements, recognizing specific hand poses, and determining the relative positioning of the hands in the three-dimensional space of an XR environment.

In some examples, the one or more tracking sensors 422 comprise an array of optical sensors capable of capturing a wide range of hand movements and gestures in real-time. These sensors can include infrared cameras that detect the position and orientation of the hands by tracking reflective markers or natural features of the skin.

In some examples, the one or more tracking sensors 422 comprise depth-sensing cameras that utilize structured light or time-of-flight technology to create a three-dimensional model of the user's hands. This allows the system to detect intricate gestures and finger movements with high accuracy.

In some examples, the one or more tracking sensors 422 comprise ultrasonic sensors that emit sound waves and measure the reflection off the user's hands to determine their location and movement in space.

In some examples, the one or more tracking sensors 422 comprise electromagnetic field sensors that track the movement of the hands by detecting changes in an electromagnetic field generated around the user.

In some examples, the one or more tracking sensors 422 include capacitive sensors embedded in gloves worn by the user. These sensors detect hand movements and gestures based on changes in capacitance caused by finger positioning and orientation.

In some examples, the XR system 410 includes one or more pose sensors 450 such as an Inertial Measurement Unit (IMU) and the like, that track the orientation and movements of the XR system of the user 408. The one or more pose sensors 450 are used to determine SixDegrees of Freedom (6DoF) data of movement of the XR system 410 in three-dimensional space. Specifically, the 6DoF data encompasses three translational movements along the x, y, and z axes (forward/back, up/down, left/right) and three rotational movements (pitch, yaw, roll) included in pose data 452. In the context of XR, 6DoF data is allows for the tracking of both position and orientation of an object or user in 3D space.

In some examples, the one or more pose sensors 450 include one or more cameras that capture images of the real-world environment. The images are included in the pose data 452. The XR system 410 uses the images and photogrammetric methodologies to determine 6DoF data of the XR system 410.

In some examples, the XR system 410 uses a combination of an IMU and one or more cameras to determine 6DoF for the XR system 410.

In some examples, the XR system 410 is operably connected to a mobile device 454. The mobile device 454 included a touch surface 460 that can be used as an input device into the XR system 410 as more fully described in reference to FIG. 2.

The XR system 410 uses a tracking pipeline 418 including a Region Of Interest (ROI) detector 432, a tracker 404, and a 3D model generator 442, to generate the 3D tracking data 440 using the tracking data 424 and the pose data 452.

The ROI detector 432 uses a ROI detector model 409 to detect a region in the real world environment that includes a hand 426 of the user 408. The ROI detector model 409 is trained to recognize those portions of the real-world environment that include a user's hands as more fully described in reference to FIG. 8A and FIG. 8B. The ROI detector 432 generates ROI data 438 indicating which portions of the tracking data 424 include one or more hands of the user 408 and communicates the ROI data 438 to the tracker 404.

The tracker 404 uses a tracking model 446 to generate 2D tracking data 444. The tracker 404 uses the tracking model 446 to recognize landmark features on portions of the one or both hands 426 of the user 408 captured in the tracking data 424 and within the ROI identified by the ROI detector 432. The tracker 404 extracts landmarks of the one or both hands 426 of the user 408 from the tracking data 424 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like. The tracking model 446 operates on the landmarks to generate the 2D tracking data 444 that includes a sequence of skeletal models of one or more hands of the user 408. The tracking model 446 is trained to generate the 2D tracking data 444 as more fully described in reference to FIG. 8A and FIG. 8B. The tracker communicates the 2D tracking data 444 to the 3D model generator 442.

The 3D model generator 442 receives the 2D tracking data 444 and generates 3D tracking data 440 using the 2D tracking data 444, the pose data 452, and a 3D coordinate generator model 448. For example, the 3D model generator 442 determines a reference position in the real-world environment for the XR system 410. The 3D model generator 442 uses a 3D coordinate generator model 448 that operates on the 2D tracking data 444 to generate the 3D tracking data 440. The 3D coordinate generator model 448 is trained to generate the 3D tracking data 440 as more fully described in reference to FIG. 8A and FIG. 8B.

In some examples, the tracker 404 generates the 3D tracking data 440 using photogrammetry methodologies to create 3D models of the hands of the user 408 from the 2D tracking data 444 by capturing overlapping pictures of the hands of the user 408 from different angles. In some examples, the 2D tracking data 444 includes multiple images taken from different angles, which are then processed to generate the 3D models that are included in the 3D tracking data 440. In some examples, the XR system 410 uses the pose data 452 captured by one or more pose sensors 450 to determine an angle or position of the XR system 410 as an image is captured of the hands of the user 408.

Accurate hand size estimation is useful for interactive technologies such as, but not limited to XR applications where precise interaction with virtual objects is desirable. An accurate estimate of hand dimensions provides that virtual objects respond realistically to users' gestures and manipulations, enhancing the immersive experience. In medical rehabilitation, accurate hand size data can be used to tailor virtual exercises to the patient's physical capabilities, thereby improving the effectiveness of the therapy. Furthermore, in the realm of biometrics, accurate hand size estimation contributes to the development of more secure and reliable hand recognition systems, which can be used for authentication purposes. XR system 410 uses the hand size estimation method 512 to accurately estimate a hand size that is then used by the tracker 404 and the 3D model generator 442 to generate the 3D tracking data 440 of the hands of the user 408.

In operation 502, the hand size estimation method 512 captures tracking data 424 of a hand 426 of a user 408 making hand movements 416 as the user 408 interacts with a touch surface of a mobile device 454. For example, the XR system 410 uses the one or more tracking sensors 422 to capture hand movements 416 being made by the user using one or both of their hands 426 as they interact with the mobile device 454. This process is initiated as the user interacts with the touch surface 460 of the mobile device 454, employing either one or both hands 426. The tracking sensors 422 are configured to detect a spectrum of hand and finger movement, gestures, and hand positions, thereby capturing detailed information about the user's interaction with the mobile device 454. This data contributes to the estimation of the hand size of the user, which serves as a parameter for calibrating the XR system's interactive capabilities in response to the user's manual inputs.

In some examples, the XR system 410 captures pose data 452 using one or more pose sensors 450 as the XR system 410 captures the tracking data 424 of the hand movement 416 using the one or more tracking sensors 422 as the user 408 interacts with the mobile device 454. The pose data 452 provides three-dimensional coordinates and pose data of the XR system 410 within the real-world environment. In some examples, the XR system 410 determines coordinates and pose of the XR system 410 in 6DoF. The acquisition of the pose data 452 enables the XR system 410 to understand a spatial relationship of the XR system 410 and the user 408 in the real-world environment as well as providing an origin in the real-world environment used to determine a position of all other objects in the real-world environment relative to the XR system 410. This provides for accurately mapping physical objects in the real-world environment as well as mapping virtual objects into the virtual or augmented reality experience that the XR system 410 generates relative to the physical objects in the real-world environment.

In some examples, the user 408 is guided to interact with the mobile device 454 using specific gestures. This interaction can be part of a setup or calibration phase where the user 408 might be required to perform gestures that are easily measurable, such as spreading fingers apart or making specific movements that are predefined by the application.

In some examples, the hand size estimation method 512 includes dynamic adjustments based on real-time feedback from the XR system 410. For example, if the XR system 410 detects that the initial gestures are not performed correctly or are not clear enough for accurate measurement, the XR system 410 can prompt the user 408 to adjust their hand positioning or repeat the gesture. This ensures that the data used for calibrating the system is as accurate as possible, leading to better performance in subsequent uses.

In some examples, interactions and calibrations are stored and processed to continuously refine the hand model and improve the system's ability to track and interpret future gestures with higher precision.

In operation 504, the XR system 410 captures a length of a reference line segment made by the user 408 as the user 408 interacts with the touch surface 460 of the mobile device 454. For example, this interaction involves the user performing specific gestures or movements on the touch surface, which are used for initial calibration or ongoing adjustments within the XR system. The XR system 410 uses the mobile device 454 to accurately measure the trajectory and length of a movement or gesture across the touch surface. The length of the reference line segment is captured simultaneously with the capturing of tracking data 424 of the hand 426 of the user 408 as the user 408 makes hand movements 416 during the interactions of the user 408 with the touch surface 460 of the mobile device 454.

Figure 6B:
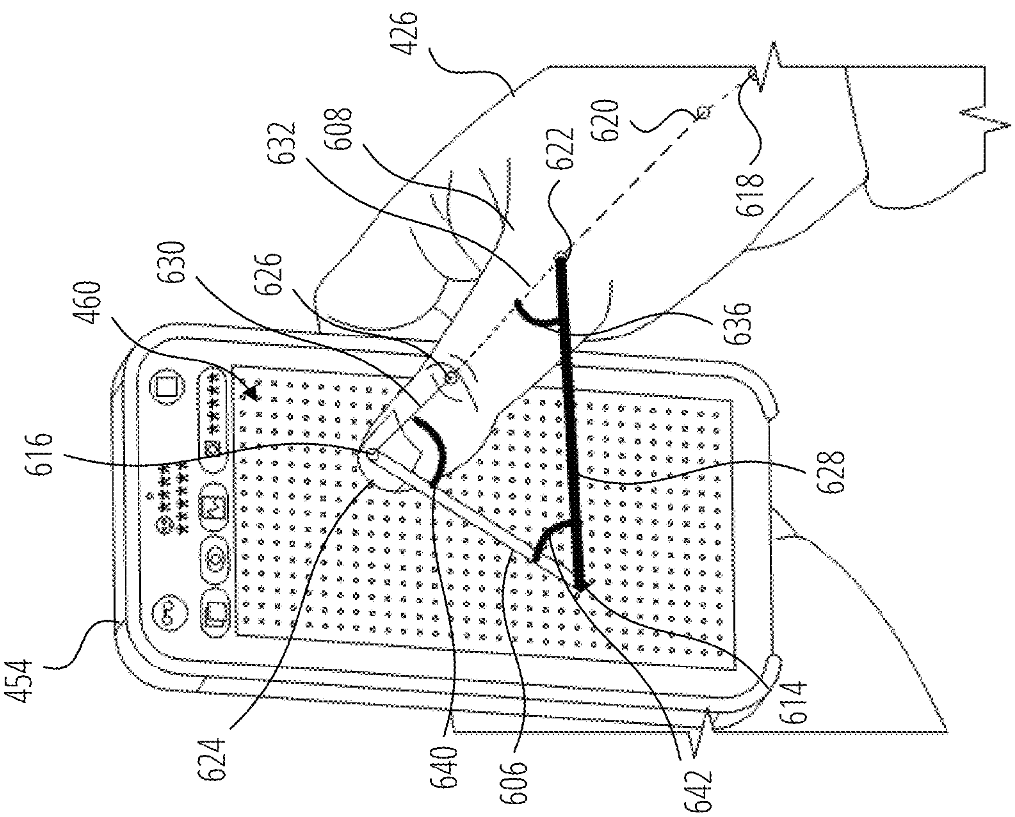
FIG. 6A and FIG. 6B illustrate a user interaction with a mobile device, according to some examples.
Figure 6A:
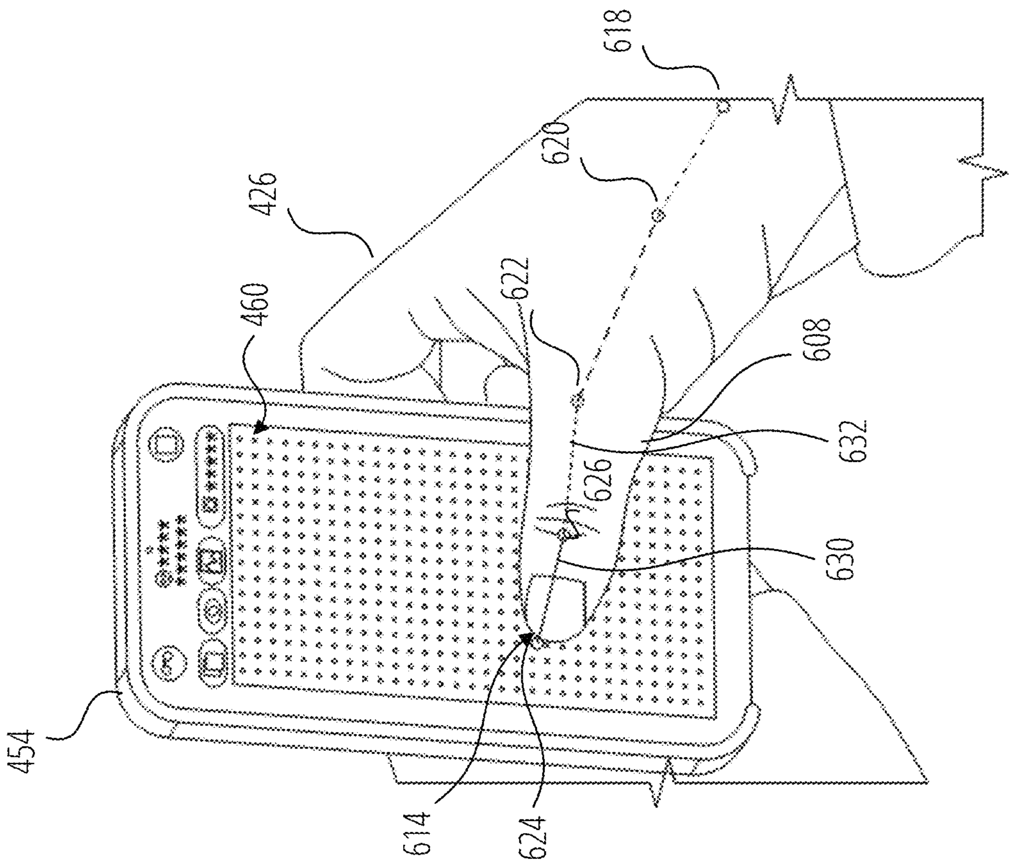

In some examples, the user 408 interacts with the mobile device 454 by using a digit such as, but not limited to, a thumb 608 of FIG. 6A and FIG. 6B, of one of their hands 426 to define a reference line segment 606 of FIG. 6B while making a sliding gesture across a touch surface 612 of FIG. 6A and FIG. 6B of the mobile device 454. The reference line segment 606 is defined by a first position 614 of FIG. 6A and a second position 616 of FIG. 6B of an identified landmark of the hand 426 of the user as the user makes the sliding gesture across the touch surface 612 of the mobile device 454. A length of the reference line segment 606 is determined by the mobile device 454 and communicated to the XR system 410.

Figure 7B:
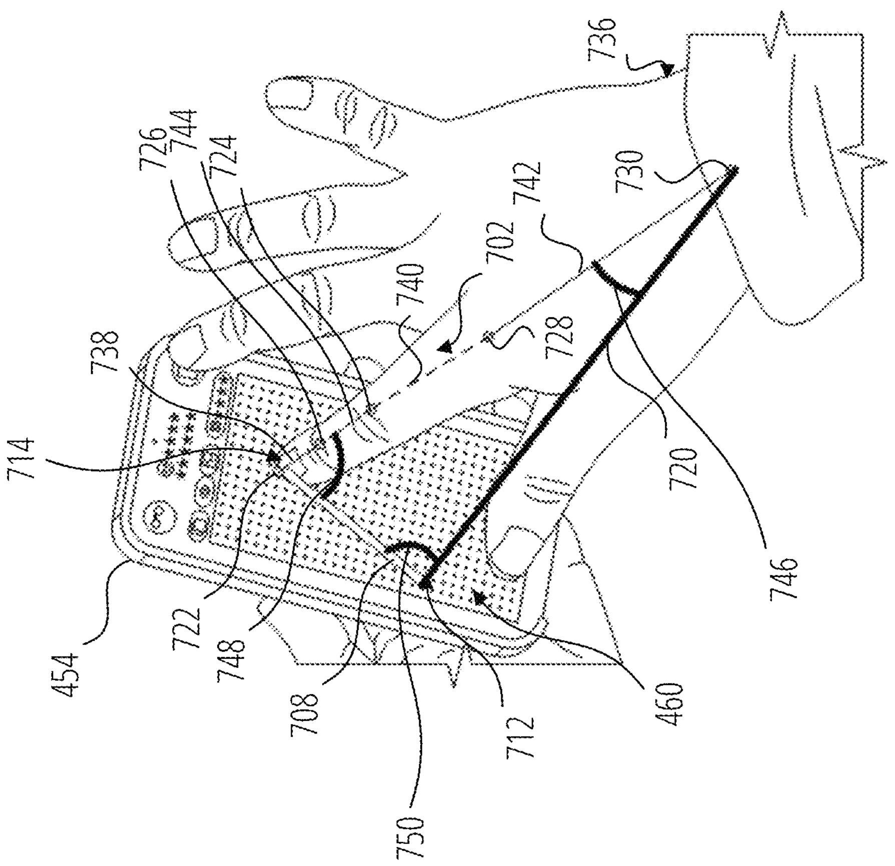
FIG. 7A and FIG. 7B illustrate another user interaction with a mobile device, according to some examples.
Figure 7A:
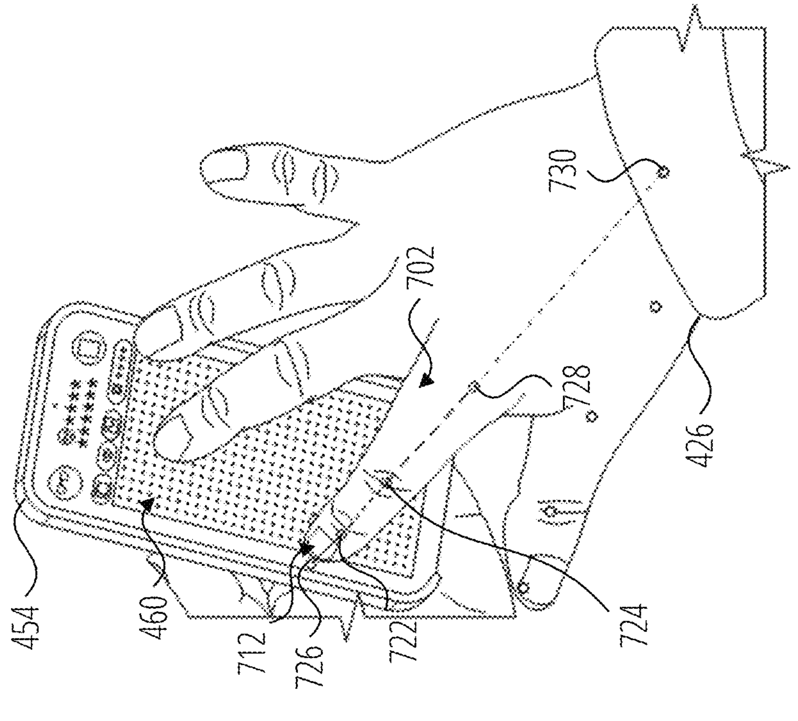

In some examples, the user 408 interacts with the mobile device 454 by using a digit such as, but not limited to, a forefinger 702 of FIG. 7A and FIG. 7B, of one of their hands 426 to define a reference line segment 708 of FIG. 7B while making a sliding gesture across a touch surface 716 of FIG. 7A and FIG. 7B of the mobile device 454. The reference line segment 708 is defined by a first position 712 of FIG. 7A and a second position 714 of FIG. 7B, of an identified landmark of the hand 426 of the user as the user makes the sliding gesture across the touch surface 716 of the mobile device 454. A length of the reference line segment 708 is determined by the mobile device 454 and communicated to the XR system 410.

In some examples, the XR system 410 determines 3D coordinate data of a reference line segment using photogrammetric methodologies using the tracking data 424 and the pose data 452. For example, the XR system 410 uses the tracking data 424 and the pose data 452 to determine a first end of the reference line segment in 3D coordinates. The XR system 410 also determines a second end of the reference line segment in 3D coordinates using the tracking data 424 and the pose data 452. The XR system 410 determines the length of the reference line segment in physical units by calculating a Euclidian distance in 3D between the first end of the reference line segment and the second end of the reference line segment.

In operation 506, the XR system 410 determines actual 3D distances between node pairs of the hand 426 of the user 408 using the captured tracking data 424, the pose data 452 of the XR system 410, and the calculated length of the reference line segment 606.

For example, in reference to FIG. 6A and FIG. 6B, XR system 410 determines a set of node pairs of the thumb 608 that the user used to make the sliding gesture, such as node pairs {node 624, node 626} and {node 626, node 522}, {node 622, node 620}, and {node 620, node 618}. The nodes correspond to joints of the thumb 608 and hand 426 and the node pairs correspond to bones of the thumb 608 and hand 426. The XR system 410 calculates an estimated distance between each node pair using the 3D distances between the nodes determined by the tracking pipeline 418 and included in the 3D tracking data 440. As the user 408 makes the sliding gesture, the user rotates their thumb at node 622 corresponding to a joint in the hand 426 of the user 408.

A triangle is determined having a first side being the reference line segment 606. A second side of the triangle is determined between the first position 614 and node 622 corresponding to a combination of arc 630 between node pair {node 624, node 626} and arc 632 of the node pair {node 626, node 622} at the beginning of the sliding gesture (represented by base line segment 628). A third side of the triangle is determined between the second position 616 and node 622 corresponding to a combination of arc 630 between node pair {node 624, node 626} and arc 632 of the node pair {node 626, node 622} at the end of the sliding gesture.

Respective interior angles, such as first interior angle 636, second interior angle 640, and third interior angle 642 are determined using the 3D coordinates of the first side, the second side, and the third side using trigonometric methodologies. For example, the interior angle between two sides represented as an intersecting line pair can be found using the equation:

$$\theta = \cos^{-1}\left(\frac{\overrightarrow{AB}\cdot\overrightarrow{CD}}{\|\overrightarrow{AB}\|\,\|\overrightarrow{CD}\|}\right)$$

where:

θ is the value in radians of an interior angle;

$\overrightarrow{AB}$ $$\overrightarrow{AB}$$

is a first line segment of an intersecting line pair; and $$\overrightarrow{CD}$$

is a second line segment of the intersecting line pair.

Once the values of the interior angles are calculated, then the Law of Sines can be used to calculate the combined length of arc 630 and arc 632 using the equations:

$$b = (a * \sin(B))/\sin(A)$$

where:

b is the combined length of combined arc 630 and arc 632;

a is a length of reference line segment 606

B is a value of the first interior angle 636 opposite combined arc 630 and arc 632; and A is a value of third interior angle 642.

The length of each arc 630 or arc 632 can be calculated using the total length of the combined arcs and a ratio between respective lengths originally estimated by the tracking pipeline 418.

As another example, in reference to FIG. 7A and FIG. 7B, an XR system determines a set of node pairs of a wrist 736 and forefinger 702 that the user uses to make a sliding gesture, such as node pairs {node 722, node 726}, {node 726, node 724}, {node 724, node 728}, and {node 728, node 730}. The nodes correspond to joints of the forefinger 702 and the wrist 736. The XR system calculates an estimated distance between each node pair using the 3D distances between the nodes determined by the tracking pipeline 418 and included in the 3D tracking data 440. As the user 408 makes the sliding gesture, the user rotates their wrist 736 at node 730.

A triangle is determined having a first side being the reference line segment 708. A second side of the triangle is determined between the first position 712 and node 730 corresponding to a combination of arc 738, arc 740, arc 744, arc 740, and arc 742 at the beginning of the sliding gesture (represented by base line segment 720). A third side of the triangle is determined between the second position 714 and node 730 corresponding to a combination of arc 738, arc 740, arc 744, arc 740, and arc 742 at the end of the sliding gesture. Respective interior angles, such as first interior angle 746, second interior angle 748, and third interior angle 750, are determined using the 3D coordinates of the first side, the second side, and the third side using trigonometric methodologies as previously described. The actual lengths of arc 738, arc 740, arc 744, arc 740, and arc 742 can be calculated using the reference line segment 708, the interior angles, and the estimated lengths of the arcs, as previously described in reference to FIG. 6A and FIG. 6B.

In reference to FIG. 5, in operation 508, the XR system 410 calculates a hand scale factor using the 3D distances between node pairs. For example, in reference to FIG. 6A and FIG. 6B, the XR system 410 uses the calculated 3D distances between node pairs, which are specific points or markers identified on the user's hand, to compute a hand scale factor. In some examples, a calibration constant for a hand scale factor of the skeletal models of the hands of the user is determined from the ratio of the total length of the combination of arc 630 and arc 632 and as a ratio between an initial estimated combined length of arc 630 and arc 632 as originally estimated by the tracking pipeline 418. This hand scale factor is a measurement that represents the proportional size of the hands of the user 408 in the real-world environment. By analyzing the distances between these nodes, the XR system 410 can generate a hand scale factor that can be used to determine a scale of virtual objects associated with the hands of the user to match the actual physical dimensions of the hands 426. This scaling of the virtual objects provides that interactions within the XR environment feel natural and intuitive, as the scaling aligns the virtual objects to actual size of the hands of the user, thus enhancing the overall user experience in XR applications.

In some examples, an iterative process for scale estimation is used that converges based on the bone length estimation from different gestures. The iterative process involves repeatedly adjusting an estimate of a hand scale factor until bone lengths calculated from various captured gestures using the estimated hand scale factor stabilize and converge to consistent values. Initially, an XR system 410 captures a series of gestures from user 408, each potentially involving different hand configurations and orientations. The iterative process continues until the differences between consecutive hand scale factor adjustments fall below a predefined threshold value, indicating that the hand scale factor has stabilized. At this point, the XR system 410 has effectively learned the appropriate hand scale factor for the hands 426 of the user 408, that can be applied to enhance the accuracy of hand tracking, gesture recognition, virtual object generation, and user interactions with virtual objects in subsequent uses. This method allows for personalized calibration of the hand tracking system, accommodating variations in hand size and shape across different users, which enhances the overall usability of the XR system 410 and effectiveness in applications requiring precise hand interaction.

In some examples, an XR system uses the calculated hand scale factor to enhance hand-tracking based interaction performance for the XR system. For example, the XR system uses the hand scale factor to refine the algorithms responsible for interpreting hand movements within the XR environment. By integrating the calculated hand scale factor, the system can more accurately map the user's physical hand movements to the corresponding virtual actions. This process can include adjustments to the spatial recognition algorithms that detect the position, orientation, and motion of the user's hands in real-time.

In some examples, an XR system utilizes techniques such as skeletal tracking, where the positions of individual hand joints are continuously monitored and analyzed. The calculated hand scale factor helps in adjusting the sensitivity of joint detection algorithms, allowing for a more precise capture of nuanced hand gestures. For example, subtle movements such as finger taps or complex gestures like sign language could are more accurately recognized and translated into the virtual environment.

In some examples, an XR system employs adaptive filtering techniques to enhance the stability and accuracy of hand tracking. These filters dynamically adjust based on the hand scale factor data to reduce noise and improve the fidelity of gesture recognition. This is beneficial in scenarios where rapid hand movements occur, ensuring that the XR system maintains accurate tracking without lag or jitter.

By leveraging these tracking techniques and adaptive algorithms, the XR system can offer a more responsive and immersive interaction experience, tailored to the physical characteristics of each user's hands. This tailored approach helps in minimizing discrepancies between intended user interactions and how they are interpreted by the system, thereby enhancing the overall usability and effectiveness of the XR technology.

In some examples, a touch surface of a mobile device includes markers to facilitate the calculation of a reference line segment These markers are strategically displayed on the touch surface to serve as reference points that an XR system can use to establish a baseline for touch input calibration. In some examples, the mobile device communicates, to the XR system, marker data including, but not limited to, physical dimensions of the markers such as size of each marker and distances between each marker. The XR system receives the marker data and uses the marker data to calculate a distance of sliding gesture made by the user. For example, in reference to FIG. 6A and FIG. 6B, the XR system uses the marker data along with tracking data to accurately determine a first position 614 and a second position 616 of a digit of a user's hand.

In some examples, the markers are arranged in a specific pattern or grid on the touch surface. For example, if the touch surface is intended to support multi-touch gestures, the markers can be used to calculate the angles and distances between multiple simultaneous touches. This calculation might involve determining the geometric center of a group of touches and measuring the distance from this center to each touch point, thereby establishing a reference line segment from the center to each touch point. In some examples, an XR system uses these measurements to adjust the touch sensitivity or calibration dynamically. For instance, if the XR system detects that the touch inputs are consistently offset from the markers, the XR system could automatically recalibrate the touch detection algorithms to compensate for this offset, ensuring more accurate first position and second position detection.

In some examples, determining 3D distances between node pairs includes using a default set of values for node pair distances and adjusting the default set of values based on the reference line segment. This process involves initially utilizing a predefined set of distance values that represent typical separations between nodes in a 3D space. These default values are based on average conditions or standard configurations that might be expected in a typical setup. However, to enhance accuracy and adapt to specific environmental conditions or configurations, these default values are adjusted using data derived from the reference line segment. The reference line segment serves as a baseline or calibration tool, providing real-world measurements that can be used to refine the theoretical or default distance values. For instance, if the reference line segment indicates that the actual distance in a specific scenario is consistently longer or shorter than the default values, the XR system can scale or adjust the default distances accordingly.

In some examples, the XR system uses the calculated hand scale factor to determine a scale of a 3D hand skeleton for subsequent semantic event detection. The 3D hand skeleton is used for accurately detecting and interpreting the gestures and actions of the user within the XR environment. For instance, the 3D hand skeleton allows the XR system to discern between different types of hand movements such as pinching, grabbing, or waving. Each of these movements involves distinct configurations of the hand's bones and joints, which the XR system can recognize and classify based on the 3D hand skeleton. The accuracy of this skeleton prediction directly impacts the XR system's ability to perform semantic event detection. Semantic event detection refers to the XR system's capability to understand the meaning behind the gestures of the user in the context of the XR environment. For example, if the user makes a grabbing motion, the XR system uses the 3D hand skeleton to determine whether the user is trying to pick up, move, or interact with a virtual object.

In some examples, capturing of tracking data is synchronized with capturing of pose data. This synchronization involves aligning the time points at which both tracking data and pose data are recorded to ensure that they correspond to the same instance of user movement or behavior. In some examples, tracking data includes information about the position and orientation of the hands of the user in space relative to the XR system, while pose data refers to the specific position and orientation of the XR system in the physical environment. In some examples, to achieve this synchronization, the system employs a unified timing mechanism that triggers data capture events for both tracking and pose data at precisely coordinated intervals. In some examples, the XR system uses a high-resolution clock to timestamp data from both sources, ensuring that each set of data can be accurately paired with its corresponding set from the other source.

In some examples, an XR system performs the functions of the tracking pipeline 418, the user interface engine 406, and the optical engine 419 utilizing various APIs and system libraries.

Machine-Learning Pipeline

Figure 8A:
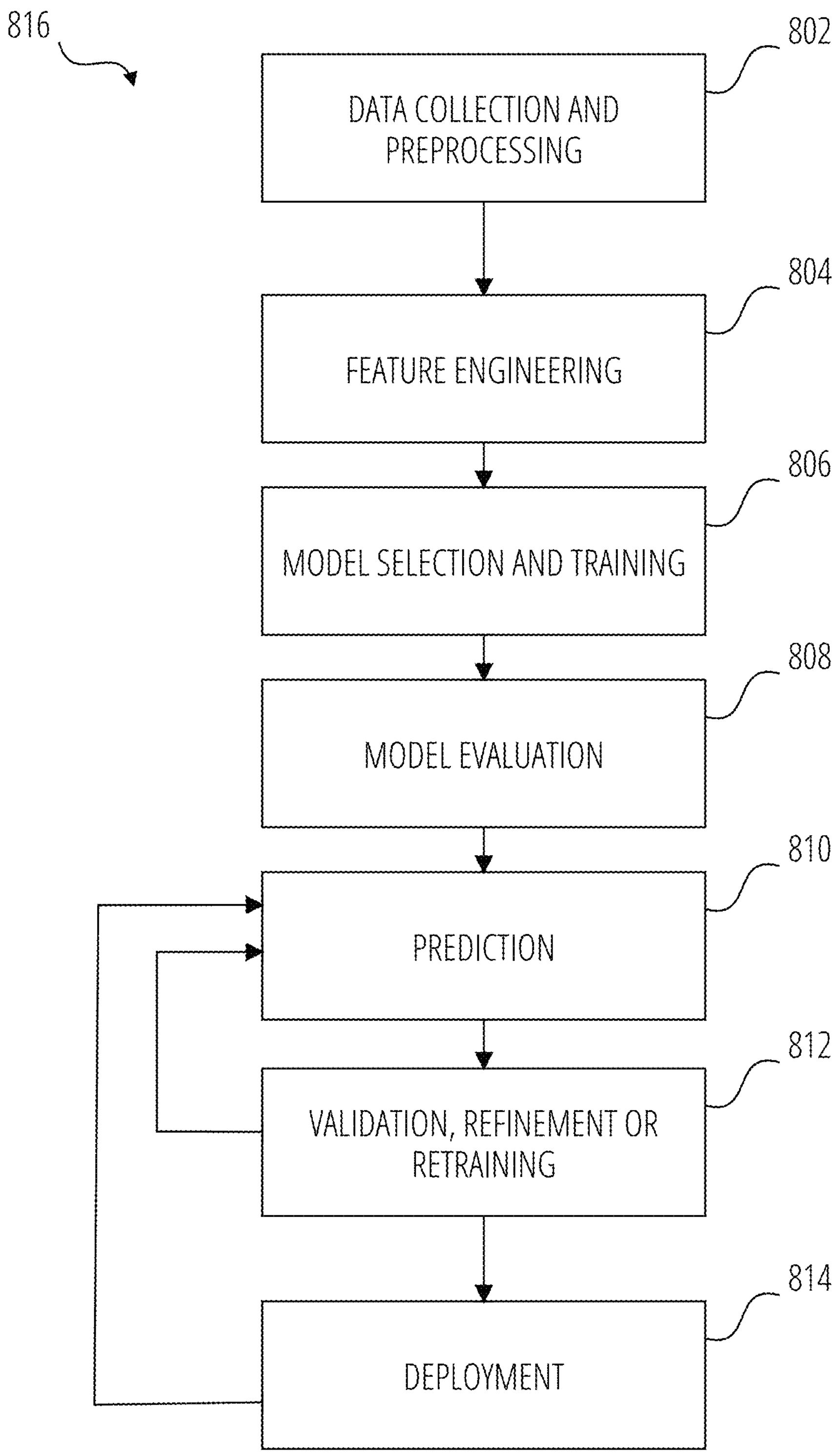
FIG. 8A illustrates a machine-learning pipeline, according to some examples.
Figure 8B:
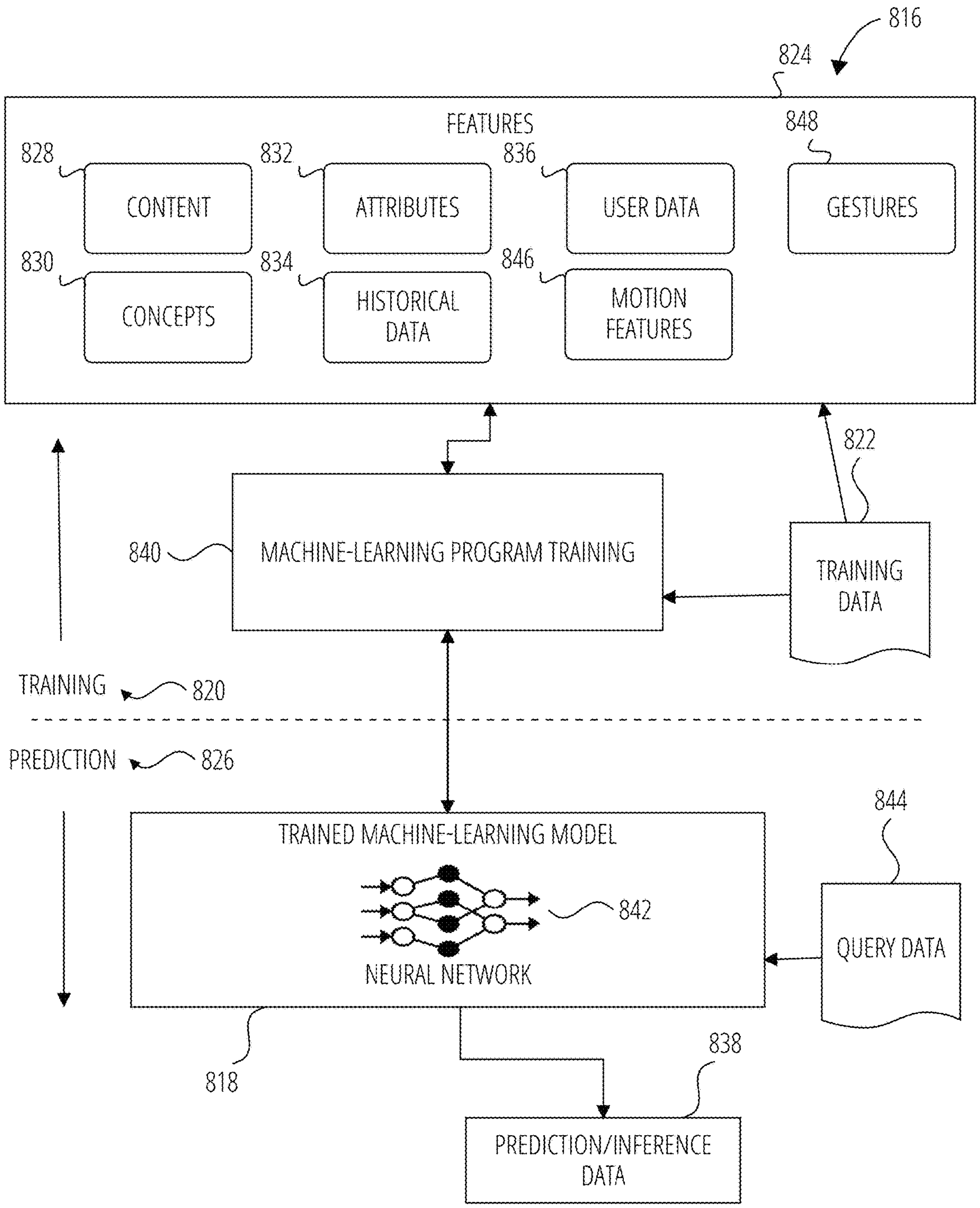
FIG. 8B illustrates training and use of a machine-learning program, according to some examples.

FIG. 8B is a flowchart depicting a machine-learning pipeline 816, according to some examples. The machine-learning pipeline 816 can be used to generate a trained machine-learning model 818, for example a ROI detector model 409 of FIG. 4 or a gesture recognition model of the tracking pipeline 418 of FIG. 4, to perform operations associated with hand gesture detection.

Overview

Broadly, machine learning can involve using computer algorithms to automatically learn patterns and relationships in data, potentially without the need for explicit programming. Machine learning algorithms can be divided into three main categories: supervised learning, unsupervised learning, and reinforcement learning.

- Supervised learning involves training a model using labeled data to predict an output for new, unseen inputs. Examples of supervised learning algorithms include linear regression, decision trees, and neural networks.
- Unsupervised learning involves training a model on unlabeled data to find hidden patterns and relationships in the data. Examples of unsupervised learning algorithms include clustering, principal component analysis, and generative models like autoencoders.
- Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that can be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting can be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Training Phases

Generating a trained machine-learning model 818 can include multiple phases that form part of the machine-learning pipeline 816, including for example the following phases illustrated in FIG. 8A:

- Data collection and preprocessing 802: This phase can include acquiring and cleaning data to ensure that it is suitable for use in the machine learning model. This phase can also include removing duplicates, handling missing values, and converting data into a suitable format.
- Feature engineering 804: This phase can include selecting and transforming the training data 822 to create features that are useful for predicting the target variable. Feature engineering can include (1) receiving features 824 (e.g., as structured or labeled data in supervised learning) and/or (2) identifying features 824 (e.g., unstructured or unlabeled data for unsupervised learning) in training data 822.
- Model selection and training 806: This phase can include selecting an appropriate machine learning algorithm and training it on the preprocessed data. This phase can further involve splitting the data into training and testing sets, using cross-validation to evaluate the model, and tuning hyperparameters to improve performance.
- Model evaluation 808: This phase can include evaluating the performance of a trained model (e.g., the trained machine-learning model 818) on a separate testing dataset. This phase can help determine if the model is overfitting or underfitting and determine whether the model is suitable for deployment.
- Prediction 810: This phase involves using a trained model (e.g., trained machine-learning model 818) to generate predictions on new, unseen data.
- Validation, refinement or retraining 812: This phase can include updating a model based on feedback generated from the prediction phase, such as new data or user feedback.
- Deployment 814: This phase can include integrating the trained model (e.g., the trained machine-learning model 818) into a more extensive system or application, such as a web service, mobile app, or IoT device. This phase can involve setting up APIs, building a user interface, and ensuring that the model is scalable and can handle large volumes of data.

FIG. 8B illustrates further details of two example phases, namely a training phase 820 (e.g., part of the model selection and trainings 806) and a prediction phase 826 (part of prediction 810). Prior to the training phase 820, feature engineering 804 is used to identify features 824. This can include identifying informative, discriminating, and independent features for effectively operating the trained machine-learning model 818 in pattern recognition, classification, and regression. In some examples, the training data 822 includes labeled data, known for pre-identified features 824 and one or more outcomes. Each of the features 824 can be a variable or attribute, such as an individual measurable property of a process, article, system, or phenomenon represented by a data set (e.g., the training data 822). Features 824 can also be of different types, such as numeric features, strings, and graphs, and can include one or more of content 828, concepts 830, attributes 832, historical data 834, user data 836, motion features 846, and/or gestures 848 merely for example.

In training phase 820, the machine-learning pipeline 816 uses the training data 822 to find correlations among the features 824 that affect a predicted outcome or prediction/inference data 838.

In some examples, the training data 822 includes tracking image data captured of various hand gestures labeled with the type of hand gesture such as, but not limited to, pinch gestures.

With the training data 822 and the identified features 824, the trained machine-learning model 818 is trained during the training phase 820 during machine-learning program training 840. The machine-learning program training 840 appraises values of the features 824 as they correlate to the training data 822. The result of the training is the trained machine-learning model 818 (e.g., a trained or learned model).

Further, the training phase 820 can involve machine learning, in which the training data 822 is structured (e.g., labeled during preprocessing operations). The trained machine-learning model 818 implements a neural network 842 capable of performing, for example, classification and clustering operations. In other examples, the training phase 820 can involve deep learning, in which the training data 822 is unstructured, and the trained machine-learning model 818 implements a deep neural network 842 that can perform both feature extraction and classification/clustering operations.

In some examples, a neural network 842 can be generated during the training phase 820, and implemented within the trained machine-learning model 818. The neural network 842 includes a hierarchical (e.g., layered) organization of neurons, with each layer consisting of multiple neurons or nodes. Neurons in the input layer receive the input data, while neurons in the output layer produce the final output of the network. Between the input and output layers, there can be one or more hidden layers, each consisting of multiple neurons.

Each neuron in the neural network 842 operationally computes a function, such as an activation function, which takes as input the weighted sum of the outputs of the neurons in the previous layer, as well as a bias term. The output of this function is then passed as input to the neurons in the next layer. If the output of the activation function exceeds a specified threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks can use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 842 can also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 820, a validation phase can be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model can be tested on a new dataset. The testing dataset is used to evaluate the model's performance and ensure that the model has not overfitted the training data.

In prediction phase 826, the trained machine-learning model 818 uses the features 824 for analyzing query data 844 to generate inferences, outcomes, or predictions, as examples of a prediction/inference data 838. For example, during prediction phase 826, the trained machine-learning model 818 generates an output. Query data 844 is provided as an input to the trained machine-learning model 818, and the trained machine-learning model 818 generates the prediction/inference data 838 as output, responsive to receipt of the query data 844.

In some examples, the query data 844 includes tracking data 424 of FIG. 4 of a hand of a user 408 of FIG. 4 as the user 408 makes hand gestures. The prediction/inference data 838 includes categorized hand gestures included in tracking data 424 of FIG. 4 that is processed by the user interface engine 406 of FIG. 4.

In some examples, a logistic regression model is employed within the XR system to facilitate predictions of user intent. Such a model is adept at predicting a probability that a given target variable falls into one of two distinct categories. Within the XR environment, these categories could represent the user's action or inaction regarding the selection of a virtual object. The logistic regression model functions by directly processing the input features—such as motion dynamics data including velocity, acceleration, and angular displacement—to calculate the likelihood of an event, such as the user's intent to select an object. Unlike more complex machine learning models that utilize hidden layers to uncover latent features within the data, logistic regression does not compute such hidden features. Instead, it applies a logistic function to the input features to produce an output value ranging between 0 and 1, which corresponds to the probability of the event. This output can then be thresholded to make a binary decision. For instance, if the probability is greater than 0.5, the event might be classified as a 'selection' of a virtual object by the user; otherwise, it might be classified as 'non-selection.' The simplicity of logistic regression, with its direct approach to feature processing and absence of hidden layers, offers computational efficiency and case of interpretation. This makes logistic regression a suitable choice for applications where the relationship between the input features and the target variable is approximately linear or when a more interpretable model is desirable.

In some examples, a model is trained using leave-one-user-out cross-validation. In this training approach, the model is repeatedly trained on the dataset of all users except one, which is held back and used for validation. This process is iterated such that each user's data is used as the validation set exactly once. The result is a machine learning model that is not only fine-tuned to the intricacies of individual user behavior but also possesses a degree of generalizability, making it capable of predicting targeting intent for users it has not encountered before.

This strategic training methodology enhances the XR system's ability to adapt to new users, ensuring that the system remains intuitive and responsive regardless of variations in individual user behavior.

Networked Computing Environment

Figure 9:
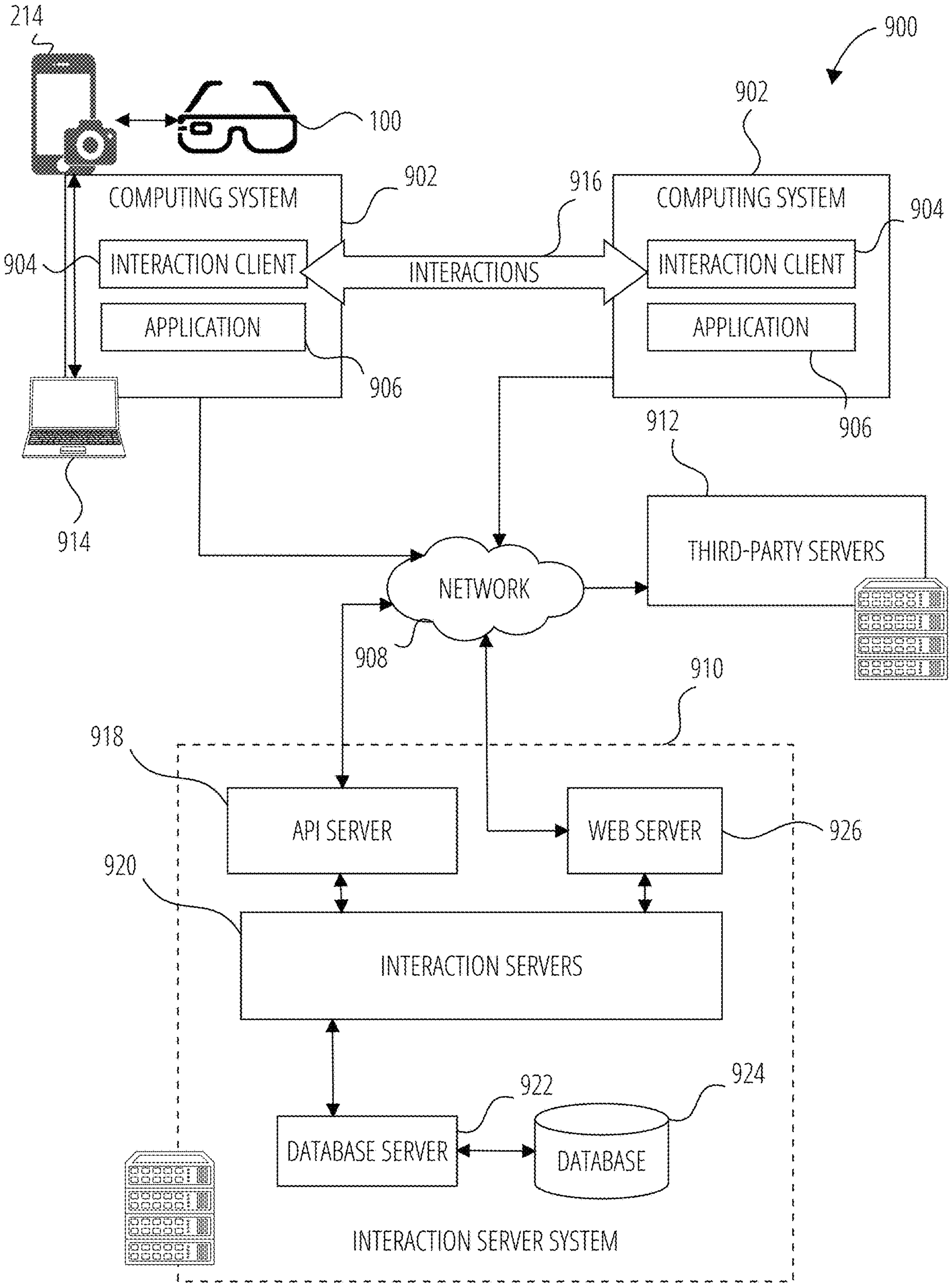
FIG. 9 is a diagrammatic representation of a networked environment in which the present disclosure can be deployed, according to some examples.

FIG. 9 is a block diagram showing an example interaction system 900 for facilitating interactions (e.g., exchanging text messages, conducting text audio and video calls, or playing games) over a network. The interaction system 900 includes multiple XR systems 902, each of which hosts multiple applications, including an interaction client 904 and other applications 906. Each interaction client 904 is communicatively coupled, via one or more communication networks including a network 908 (e.g., the Internet), to other instances of the interaction client 904 (e.g., hosted on respective other XR systems 902), an interaction server system 910 and third-party servers 912). An interaction client 904 can also communicate with locally hosted applications 906 using Applications Program Interfaces (APIs).

Each computing system 902 can comprise one or more user devices, such as a mobile device 214, head-wearable apparatus 100, and a computer client device 914 that are communicatively connected to exchange data and messages.

An interaction client 904 interacts with other interaction clients 904 and with the interaction server system 910 via the network 908. The data exchanged between the interaction clients 904 (e.g., interactions 916) and between the interaction clients 904 and the interaction server system 910 includes functions (e.g., commands to invoke functions) and payload data (e.g., text, audio, video, or other multimedia data).

The interaction server system 910 provides server-side functionality via the network 908 to the interaction clients 904. While some functions of the interaction system 900 are described herein as being performed by either an interaction client 904 or by the interaction server system 910, the location of some functionality either within the interaction client 904 or the interaction server system 910 can be a design choice. For example, it can be technically preferable to initially deploy particular technology and functionality within the interaction server system 910 but to later migrate this technology and functionality to the interaction client 904 where a computing system 902 has sufficient processing capacity.

The interaction server system 910 supports various services and operations that are provided to the interaction clients 904. Such operations include transmitting data to, receiving data from, and processing data generated by the interaction clients 904. This data can include message content, client device information, geolocation information, media augmentation and overlays, message content persistence conditions, social network information, and live event information. Data exchanges within the interaction system 900 are invoked and controlled through functions available via user interfaces (UIs) of the interaction clients 904.

Turning now specifically to the interaction server system 910, an Application Program Interface (API) server 918 is coupled to and provides programmatic interfaces to Interaction servers 920, making the functions of the Interaction servers 920 accessible to interaction clients 904, other applications 906 and third-party server 912. The interaction servers 920 are communicatively coupled to a database server 922, facilitating access to a database 924 that stores data associated with interactions processed by the Interaction servers 920. Similarly, a web server 926 is coupled to the interaction servers 920 and provides web-based interfaces to the Interaction servers 920. To this end, the web server 926 processes incoming network requests over the Hypertext Transfer Protocol (HTTP) and several other related protocols.

The Application Program Interface (API) server 918 receives and transmits interaction data (e.g., commands and message payloads) between the interaction servers 920 and the XR systems 902 (and, for example, interaction clients 904 and other application 906) and the third-party server 912. Specifically, the Application Program Interface (API) server 918 provides a set of interfaces (e.g., routines and protocols) that can be called or queried by the interaction client 904 and other applications 906 to invoke functionality of the Interaction servers 920. The Application Program Interface (API) server 918 exposes various functions supported by the Interaction servers 920, including account registration; login functionality; the sending of interaction data, via the Interaction servers 920, from a particular interaction client 904 to another interaction client 904; the communication of media files (e.g., images or video) from an interaction client 904 to the interaction servers 920; the settings of a collection of media data (e.g., a story); the retrieval of a list of friends of a user of a computing system 902; the retrieval of messages and content; the addition and deletion of entities (e.g., friends) to an entity graph (e.g., a social graph); the location of friends within a social graph; and opening an application event (e.g., relating to the interaction client 904).

The interaction servers 920 host multiple systems and subsystems, described below with reference to FIG. 11.

Returning to the interaction client 904, features and functions of an external resource (e.g., a linked application 906 or applet) are made available to a user via an interface of the interaction client 904. In this context, "external" refers to the fact that the application 906 or applet is external to the interaction client 904. The external resource is often provided by a third party but can also be provided by the creator or provider of the interaction client 904. The interaction client 904 receives a user selection of an option to launch or access features of such an external resource. The external resource can be the application 906 installed on the computing system 902 (e.g., a "native app"), or a small-scale version of the application (e.g., an "applet") that is hosted on the computing system 902 or remote of the computing system 902 (e.g., on third-party servers 912). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 904. In addition to using markup-language documents (e.g., a .*ml file), an applet can incorporate a scripting language (e.g., a .*js file or a .json file) and a style sheet (e.g., a .*ss file).

In response to receiving a user selection of the option to launch or access features of the external resource, the interaction client 904 determines whether the selected external resource is a web-based external resource or a locally-installed application 906. In some cases, applications 906 that are locally installed on the computing system 902 can be launched independently of and separately from the interaction client 904, such as by selecting an icon corresponding to the application 906 on a home screen of the computing system 902. Small-scale versions of such applications can be launched or accessed via the interaction client 904 and, in some examples, no or limited portions of the small-scale application can be accessed outside of the interaction client 904. The small-scale application can be launched by the interaction client 904 receiving, from a third-party server 912 for example, a markup-language document associated with the small-scale application and processing such a document.

In response to determining that the external resource is a locally-installed application 906, the interaction client 904 instructs the computing system 902 to launch the external resource by executing locally-stored code corresponding to the external resource. In response to determining that the external resource is a web-based resource, the interaction client 904 communicates with the third-party servers 912 (for example) to obtain a markup-language document corresponding to the selected external resource. The interaction client 904 then processes the obtained markup-language document to present the web-based external resource within a user interface of the interaction client 904.

The interaction client 904 can notify a user of the computing system 902, or other users related to such a user (e.g., "friends"), of activity taking place in one or more external resources. For example, the interaction client 904 can provide participants in a conversation (e.g., a chat session) in the interaction client 904 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 904, with the ability to share an item, status, state, or location in an external resource in a chat session with one or more members of a group of users. The shared item can be an interactive chat card with which members of the chat can interact, for example, to launch the corresponding external resource, view specific information within the external resource, or take the member of the chat to a specific location or state within the external resource. Within a given external resource, response messages can be sent to users on the interaction client 904. The external resource can selectively include different media items in the responses, based on a current context of the external resource.

The interaction client 904 can present a list of the available external resources (e.g., applications 906 or applets) to a user to launch or access a given external resource. This list can be presented in a context-sensitive menu. For example, the icons representing different ones of the application 906 (or applets) can vary based on how the menu is launched by the user (e.g., from a conversation interface or from a non-conversation interface).

Data Architecture

Figure 10:
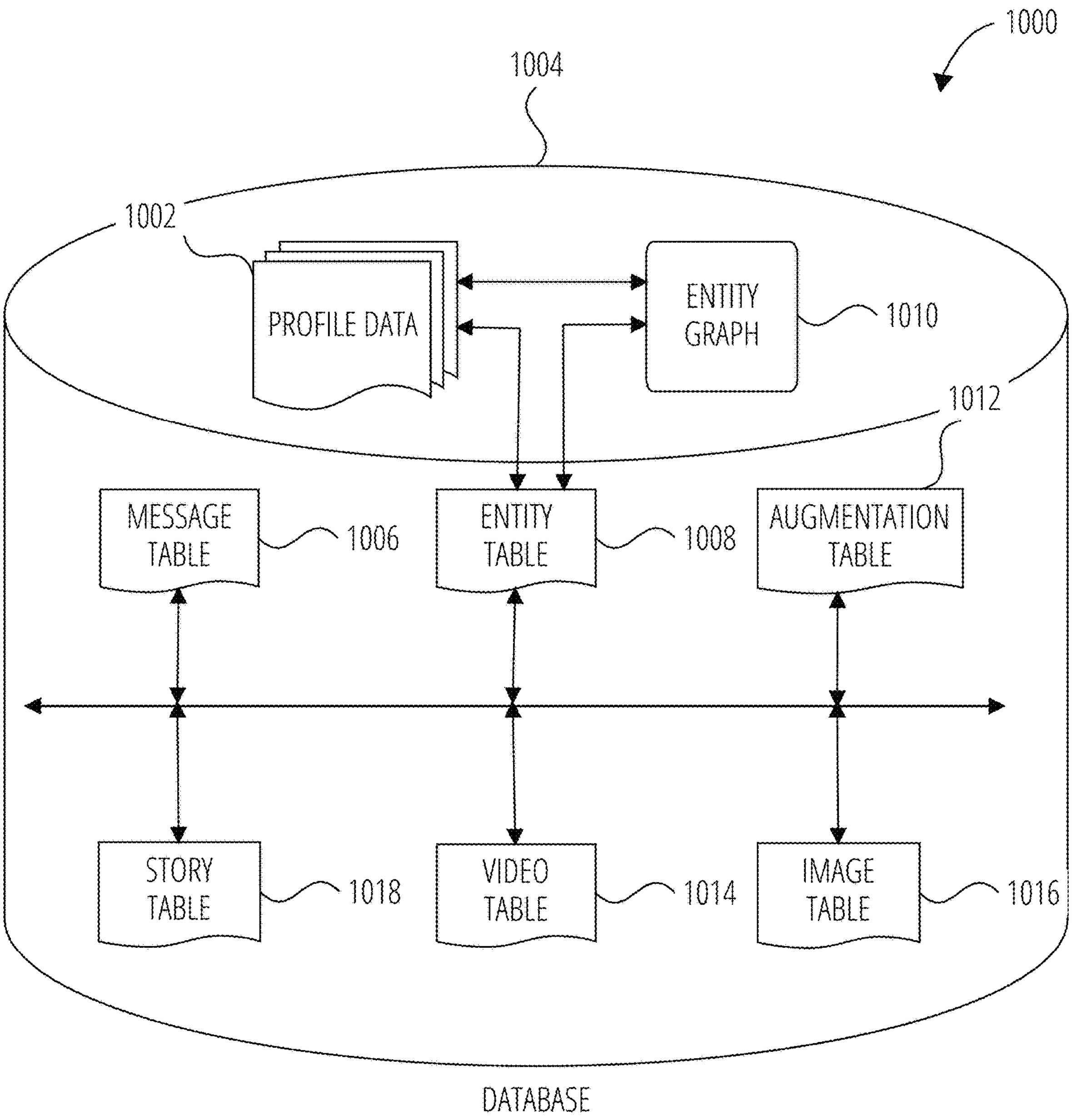
FIG. 10 is a diagrammatic representation of a data structure as maintained in a database, according to some examples.

FIG. 10 is a schematic diagram illustrating data structures 1000, which can be stored in the database 1004 of the interaction server system 910, according to some examples. While the content of the database 1004 is shown to comprise multiple tables, it will be appreciated that the data could be stored in other types of data structures (e.g., as an object-oriented database).

The database 1004 includes message data stored within a message table 1006. This message data includes, for any particular message, at least message sender data, message recipient (or receiver) data, and a payload. Further details regarding information that can be included in a message, and included within the message data stored in the message table 1006, are described below with reference to FIG. 10.

An entity table 1008 stores entity data, and is linked (e.g., referentially) to an entity graph 1010 and profile data 1002. Entities for which records are maintained within the entity table 1008 can include individuals, corporate entities, organizations, objects, places, events, and so forth. Regardless of entity type, any entity regarding which the interaction server system 910 stores data can be a recognized entity. Each entity is provided with a unique identifier, as well as an entity type identifier (not shown).

The entity graph 1010 stores information regarding relationships and associations between entities. Such relationships can be social, professional (e.g., work at a common corporation or organization), interest-based, or activity-based, merely for example. Some relationships between entities can be unidirectional, such as a subscription by an individual user to digital content of a commercial or publishing user (e.g., a newspaper or other digital media outlet, or a brand). Other relationships can be bidirectional, such as a "friend" relationship between individual users of the interaction system 900.

some permissions and relationships can be attached to each relationship, and also to each direction of a relationship. For example, a bidirectional relationship (e.g., a friend relationship between individual users) can include authorization for the publication of digital content items between the individual users, but can impose some restrictions or filters on the publication of such digital content items (e.g., based on content characteristics, location data or time of day data). Similarly, a subscription relationship between an individual user and a commercial user can impose different degrees of restrictions on the publication of digital content from the commercial user to the individual user, and can significantly restrict or block the publication of digital content from the individual user to the commercial user. A particular user, as an example of an entity, can record some restrictions (e.g., by way of privacy settings) in a record for that entity within the entity table 1008. Such privacy settings can be applied to all types of relationships within the context of the interaction system 900, or can selectively be applied to only some types of relationships.

The profile data 1002 stores multiple types of profile data about a particular entity. The profile data 1002 can be selectively used and presented to other users of the interaction system 900 based on privacy settings specified by a particular entity. Where the entity is an individual, the profile data 1002 includes, for example, a username, telephone number, address, settings (e.g., notification and privacy settings), as well as a user-selected avatar representation (or collection of such avatar representations). A particular user can then selectively include one or more of these avatar representations within the content of messages communicated via the interaction system 900, and on map interfaces displayed by interaction clients 904 to other users. The collection of avatar representations can include "status avatars," which present a graphical representation of a status or activity that the user can select to communicate at a particular time.

Where the entity is a group, the profile data 1002 for the group can similarly include one or more avatar representations associated with the group, in addition to the group name, members, and various settings (e.g., notifications) for the relevant group.

The database 1004 also stores augmentation data, such as overlays or filters, in an augmentation table 1012. The augmentation data is associated with and applied to videos (for which data is stored in a video table 1014) and images (for which data is stored in an image table 1016).

Filters, in some examples, are overlays that are displayed as overlaid on an image or video during presentation to a message receiver. Filters can be of various types, including user-selected filters from a set of filters presented to a message sender by the interaction client 904 when the message sender is composing a message. Other types of filters include geolocation filters (also known as geo-filters), which can be presented to a message sender based on geographic location. For example, geolocation filters specific to a neighborhood or special location can be presented within a user interface by the interaction client 904, based on geolocation information determined by a Global Positioning System (GPS) unit of the computing system 902.

Another type of filter is a data filter, which can be selectively presented to a message sender by the interaction client 904 based on other inputs or information gathered by the computing system 902 during the message creation process. Examples of data filters include current temperature at a specific location, a current speed at which a message sender is traveling, battery life for a computing system 902, or the current time.

Other augmentation data that can be stored within the image table 1016 includes augmented reality content items (e.g., corresponding to applying Lenses or augmented reality experiences). An augmented reality content item can be a real-time special effect and sound that can be added to an image or a video.

As described above, augmentation data includes AR, VR, and mixed reality (MR) content items, overlays, image transformations, images, and modifications that can be applied to image data (e.g., videos or images). This includes real-time modifications, which modify an image as it is captured using device sensors (e.g., one or multiple cameras) of the computing system 902 and then displayed on a screen of the computing system 902 with the modifications. This also includes modifications to stored content, such as video clips in a collection or group that can be modified. For example, in a computing system 902 with access to multiple augmented reality content items, a user can use a single video clip with multiple augmented reality content items to see how the different augmented reality content items will modify the stored clip. Similarly, real-time video capture can use modifications to show how video images currently being captured by sensors of a computing system 902 would modify the captured data. Such data can simply be displayed on the screen and not stored in memory, or the content captured by the device sensors can be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations can be used. Some examples can involve generating a three-dimensional mesh model of the object or objects, and using transformations and animated textures of the model within the video to achieve the transformation. In some examples, tracking of points on an object can be used to place an image or texture (which can be two-dimensional or three-dimensional) at the tracked position. In still further examples, neural network analysis of video frames can be used to place images, models, or textures in content (e.g., images or frames of video). Augmented reality content items thus refer both to the images, models, and textures used to create transformations in content, as well as to additional modeling and analysis information used to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications can involve changing the color of areas; removing some part of areas from the frames of the video stream; including new objects into areas that are based on a request for modification; and modifying or distorting the elements of an area or object. In various examples, any combination of such modifications or other similar modifications can be used. For some models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in a portion of the images under consideration. For facial landmarks, for example, the location of the left eye pupil can be used. If an initial landmark is not identifiable (e.g., if a person has an eyepatch), secondary landmarks can be used. Such landmark identification procedures can be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 902) and perform complex image manipulations locally on the computing system 902 while maintaining a suitable user experience, computation time, and power consumption. The complex image manipulations can include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 902.

In some examples, a computer animation model to transform image data can be used by a system where a user can capture an image or video stream of the user (e.g., a selfie) using the computing system 902 having a neural network operating as part of an interaction client 904 operating on the computing system 902. The transformation system operating within the interaction client 904 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream can be presented in a graphical user interface displayed on the computing system 902 as soon as the image or video stream is captured and a specified modification is selected. The transformation system can implement a complex convolutional neural network on a portion of the image or video stream to generate and apply the selected modification. That is, the user can capture the image or video stream and be presented with a modified result in real-time or near real-time once a modification icon has been selected. Further, the modification can be persistent while the video stream is being captured, and the selected modification icon remains toggled. Machine-taught neural networks can be used to enable such modifications.

The graphical user interface, presenting the modification performed by the transform system, can supply the user with additional interaction options. Such options can be based on the interface used to initiate the content capture and selection of a particular computer animation model (e.g., initiation from a content creator user interface). In various examples, a modification can be persistent after an initial selection of a modification icon. The user can toggle the modification on or off by tapping or otherwise selecting the face being modified by the transformation system and store it for later viewing or browsing to other areas of the imaging application. Where multiple faces are modified by the transformation system, the user can toggle the modification on or off globally by tapping or selecting a single face modified and displayed within a graphical user interface. In some examples, individual faces, among a group of multiple faces, can be individually modified, or such modifications can be individually toggled by tapping or selecting the individual face or a series of individual faces displayed within the graphical user interface.

A story table 1018 stores data regarding collections of messages and associated image, video, or audio data, which are compiled into a collection (e.g., a story or a gallery). The creation of a particular collection can be initiated by a particular user (e.g., each user for which a record is maintained in the entity table 1008). A user can create a "personal story" in the form of a collection of content that has been created and sent/broadcast by that user. To this end, the user interface of the interaction client 904 can include an icon that is user-selectable to enable a message sender to add specific content to his or her personal story.

A collection can also constitute a "live story," which is a collection of content from multiple users that is created manually, automatically, or using a combination of manual and automatic techniques. For example, a "live story" can constitute a curated stream of user-submitted content from various locations and events. Users whose client devices have location services enabled and are at a common location event at a particular time can, for example, be presented with an option, via a user interface of the interaction client 904, to contribute content to a particular live story. The live story can be identified to the user by the interaction client 904, based on his or her location. The end result is a "live story" told from a community perspective.

A further type of content collection is known as a "location story," which enables a user whose computing system 902 is located within a specific geographic location (e.g., on a college or university campus) to contribute to a particular collection. In some examples, a contribution to a location story can require a second degree of authentication to verify that the end-user belongs to a specific organization or other entity (e.g., is a student on the university campus).

As mentioned above, the video table 1014 stores video data that, in some examples, is associated with messages for which records are maintained within the message table 1006. Similarly, the image table 1016 stores image data associated with messages for which message data is stored in the entity table 1008. The entity table 1008 can associate various augmentations from the augmentation table 1012 with various images and videos stored in the image table 1016 and the video table 1014.

The databases 1004 also includes social network information collected by the social network system 1122.

System Architecture

Figure 11:
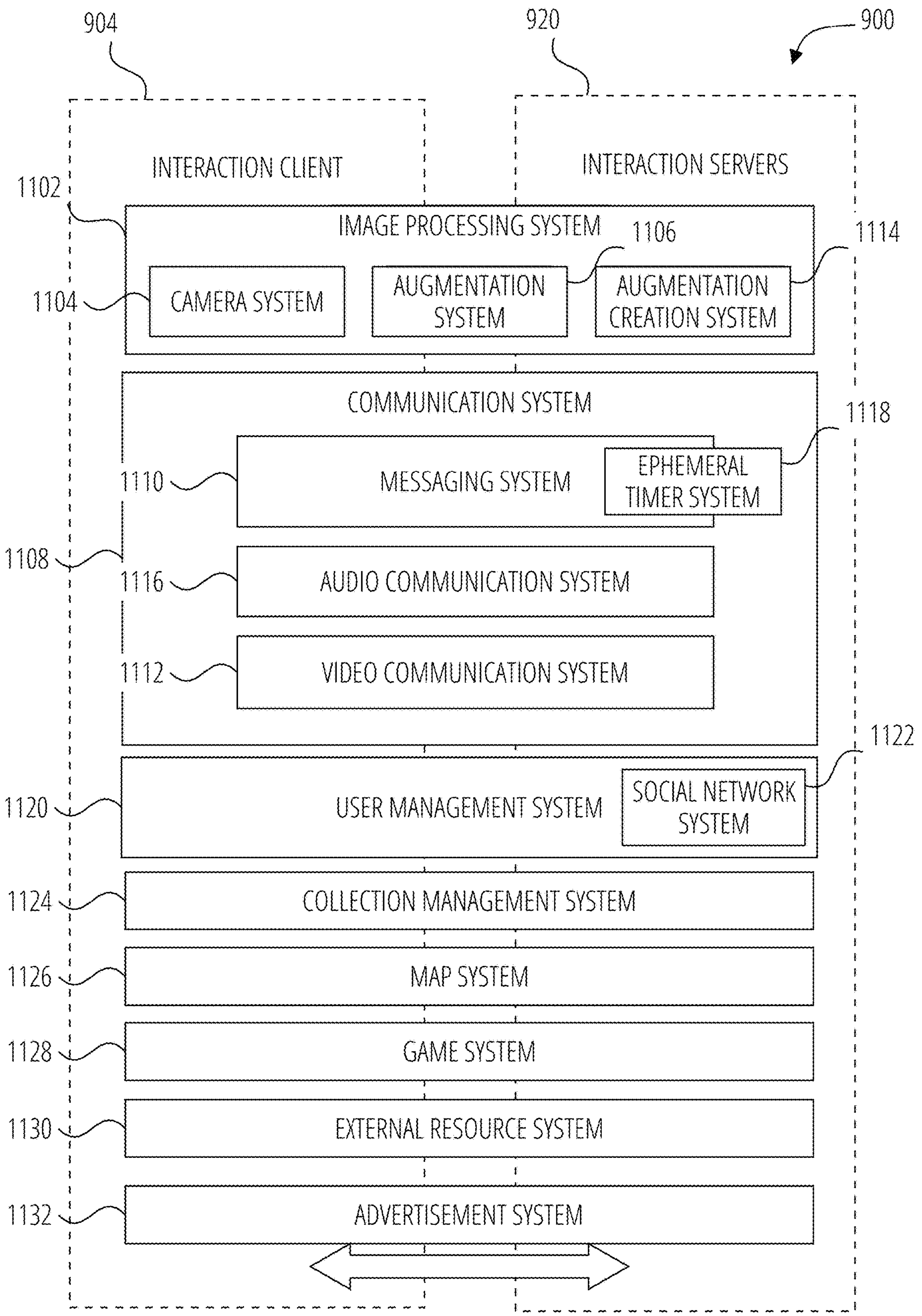
FIG. 11 is a diagrammatic representation of a messaging system that has both client-side and server-side functionality, according to some examples.

FIG. 11 is a block diagram illustrating further details regarding the interaction system 900, according to some examples. Specifically, the interaction system 900 is shown to comprise the interaction client 904 and the Interaction servers 920. The interaction system 900 embodies multiple subsystems, which are supported on the client-side by the interaction client 904 and on the server-side by the Interaction servers 920. Example subsystems are discussed below.

An image processing system 1102 provides various functions that enable a user to capture and augment (e.g., augment or otherwise modify or edit) media content associated with a message.

A camera system 1104 includes control software (e.g., in a camera application) that interacts with and controls hardware camera hardware (e.g., directly or via operating system controls) of the computing system 902 to modify and augment real-time images captured and displayed via the interaction client 904.

The augmentation system 1106 provides functions related to the generation and publishing of augmentations (e.g., media overlays) for images captured in real-time by cameras of the computing system 902 or retrieved from memory of the computing system 902. For example, the augmentation system 1106 operatively selects, presents, and displays media overlays (e.g., an image filter or an image lens) to the interaction client 904 for the augmentation of real-time images received via the camera system 1104 or stored images retrieved from memory 202 of a computing system 902. These augmentations are selected by the augmentation system 1106 and presented to a user of an interaction client 904, based on a number of inputs and data, such as for example:

Geolocation of the computing system 902; and

Social network information of the user of the computing system 902.

An augmentation can include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 902 for communication in a message, or applied to video content, such as a video content stream or feed transmitted from an interaction client 904. As such, the image processing system 1102 can interact with, and support, the various subsystems of the communication system 1108, such as the messaging system 1110 and the video communication system 1112.

A media overlay can include text or image data that can be overlaid on top of a photograph taken by the computing system 902 or a video stream produced by the computing system 902. In some examples, the media overlay can be a location overlay (e.g., Venice beach), a name of a live event, or a name of a merchant overlay (e.g., Beach Coffee House). In further examples, the image processing system 1102 uses the geolocation of the computing system 902 to identify a media overlay that includes the name of a merchant at the geolocation of the computing system 902. The media overlay can include other indicia associated with the merchant. The media overlays can be stored in the databases 924 and accessed through the database server 922.

The image processing system 1102 provides a user-based publication platform that enables users to select a geolocation on a map and upload content associated with the selected geolocation. The user can also specify circumstances under which a particular media overlay should be offered to other users. The image processing system 1102 generates a media overlay that includes the uploaded content and associates the uploaded content with the selected geolocation.

The augmentation creation system 1114 supports augmented reality developer platforms and includes an application for content creators (e.g., artists and developers) to create and publish augmentations (e.g., augmented reality experiences) of the interaction client 904. The augmentation creation system 1114 provides a library of built-in features and tools to content creators including, for example custom shaders, tracking technology, and templates.

In some examples, the augmentation creation system 1114 provides a merchant-based publication platform that enables merchants to select a particular augmentation associated with a geolocation via a bidding process. For example, the augmentation creation system 1114 associates a media overlay of the highest bidding merchant with a corresponding geolocation for a predefined amount of time.

A communication system 1108 is responsible for enabling and processing multiple forms of communication and interaction within the interaction system 900 and includes a messaging system 1110, an audio communication system 1116, and a video communication system 1112. The messaging system 1110 is responsible for enforcing the temporary or time-limited access to content by the interaction clients 904. The messaging system 1110 incorporates multiple timers (e.g., within an ephemeral timer system 1118) that, based on duration and display parameters associated with a message or collection of messages (e.g., a story), selectively enable access (e.g., for presentation and display) to messages and associated content via the interaction client 904. Further details regarding the operation of the ephemeral timer system 1118 are provided below. The audio communication system 1116 enables and supports audio communications (e.g., real-time audio chat) between multiple interaction clients 904. Similarly, the video communication system 1112 enables and supports video communications (e.g., real-time video chat) between multiple interaction clients 904.

A user management system 1120 is operationally responsible for the management of user data and profiles, and includes a social network system 1122 that maintains social network information regarding relationships between users of the interaction system 900.

A collection management system 1124 is operationally responsible for managing sets or collections of media (e.g., collections of text, image video, and audio data). A collection of content (e.g., messages, including images, video, text, and audio) can be organized into an "event gallery" or an "event story." Such a collection can be made available for a specified time period, such as the duration of an event to which the content relates. For example, content relating to a music concert can be made available as a "story" for the duration of that music concert. The collection management system 1124 can also be responsible for publishing an icon that provides notification of a particular collection to the user interface of the interaction client 904. The collection management system 1124 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1124 employs machine vision (or image recognition technology) and content rules to curate a content collection automatically. In some examples, compensation can be paid to a user to include user-generated content into a collection. In such cases, the collection management system 1124 operates to automatically make payments to such users to use their content.

A map system 1126 provides various geographic location functions and supports the presentation of map-based media content and messages by the interaction client 904. For example, the map system 1126 enables the display of user icons or avatars (e.g., stored in profile data 1002) on a map to indicate a current or past location of "friends" of a user, as well as media content (e.g., collections of messages including photographs and videos) generated by such friends, within the context of a map. For example, a message posted by a user to the interaction system 900 from a specific geographic location can be displayed within the context of a map at that particular location to "friends" of a specific user on a map interface of the interaction client 904. A user can furthermore share his or her location and status information (e.g., using an appropriate status avatar) with other users of the interaction system 900 via the interaction client 904, with this location and status information being similarly displayed within the context of a map interface of the interaction client 904 to selected users.

A game system 1128 provides various gaming functions within the context of the interaction client 904. The interaction client 904 provides a game interface providing a list of available games that can be launched by a user within the context of the interaction client 904 and played with other users of the interaction system 900. The interaction system 900 further enables a particular user to invite other users to participate in the play of a specific game by issuing invitations to such other users from the interaction client 904. The interaction client 904 also supports audio, video, and text messaging (e.g., chats) within the context of gameplay, provides a leaderboard for the games, and also supports the provision of in-game rewards (e.g., coins and items).

An external resource system 1130 provides an interface for the interaction client 904 to communicate with remote servers (e.g., third-party servers 912) to launch or access external resources, i.e., applications or applets. Each third-party server 912 hosts, for example, a markup language (e.g., HTML5) based application or a small-scale version of an application (e.g., game, utility, payment, or ride-sharing application). The interaction client 904 can launch a web-based resource (e.g., application) by accessing the HTML5 file from the third-party servers 912 associated with the web-based resource. Applications hosted by third-party servers 912 are programmed in JavaScript leveraging a Software Development Kit (SDK) provided by the Interaction servers 920. The SDK includes Application Programming Interfaces (APIs) with functions that can be called or invoked by the web-based application. The Interaction servers 920 host a JavaScript library that provides a given external resource access to specific user data of the interaction client 904. HTML5 is an example of technology for programming games, but applications and resources programmed based on other technologies can be used.

To integrate the functions of the SDK into the web-based resource, the SDK is downloaded by the third-party server 912 from the Interaction servers 920 or is otherwise received by the third-party server 912. Once downloaded or received, the SDK is included as part of the application code of a web-based external resource. The code of the web-based resource can then call or invoke functions of the SDK to integrate features of the interaction client 904 into the web-based resource.

The SDK stored on the interaction server system 910 effectively provides the bridge between an external resource (e.g., applications 906 or applets) and the interaction client 904. This gives the user a seamless experience of communicating with other users on the interaction client 904 while also preserving the look and feel of the interaction client 904. To bridge communications between an external resource and an interaction client 904, the SDK facilitates communication between third-party servers 912 and the interaction client 904. A WebViewJavaScriptBridge running on a computing system 902 establishes two one-way communication channels between an external resource and the interaction client 904. Messages are sent between the external resource and the interaction client 904 via these communication channels asynchronously. Each SDK function invocation is sent as a message and callback. Each SDK function is implemented by constructing a unique callback identifier and sending a message with that callback identifier.

By using the SDK, not all information from the interaction client 904 is shared with third-party servers 912. The SDK limits which information is shared based on the needs of the external resource. Each third-party server 912 provides an HTML5 file corresponding to the web-based external resource to Interaction servers 920. The Interaction servers 920 can add a visual representation (such as a box art or other graphic) of the web-based external resource in the interaction client 904. Once the user selects the visual representation or instructs the interaction client 904 through a GUI of the interaction client 904 to access features of the web-based external resource, the interaction client 904 obtains the HTML5 file and instantiates the resources to access the features of the web-based external resource.

The interaction client 904 presents a graphical user interface (e.g., a landing page or title screen) for an external resource. During, before, or after presenting the landing page or title screen, the interaction client 904 determines whether the launched external resource has been previously authorized to access user data of the interaction client 904. In response to determining that the launched external resource has been previously authorized to access user data of the interaction client 904, the interaction client 904 presents another graphical user interface of the external resource that includes functions and features of the external resource. In response to determining that the launched external resource has not been previously authorized to access user data of the interaction client 904, after a threshold period of time (e.g., 3 seconds) of displaying the landing page or title screen of the external resource, the interaction client 904 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 904 adds the external resource to a list of authorized external resources and allows the external resource to access user data from the interaction client 904. The external resource is authorized by the interaction client 904 to access the user data under an OAuth 2 framework.

The interaction client 904 controls the type of user data that is shared with external resources based on the type of external resource being authorized. For example, external resources that include full-scale applications (e.g., an application 906) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1132 operationally enables the purchasing of advertisements by third parties for presentation to end-users via the interaction clients 904 and also handles the delivery and presentation of these advertisements.

Software Architecture

Figure 12:
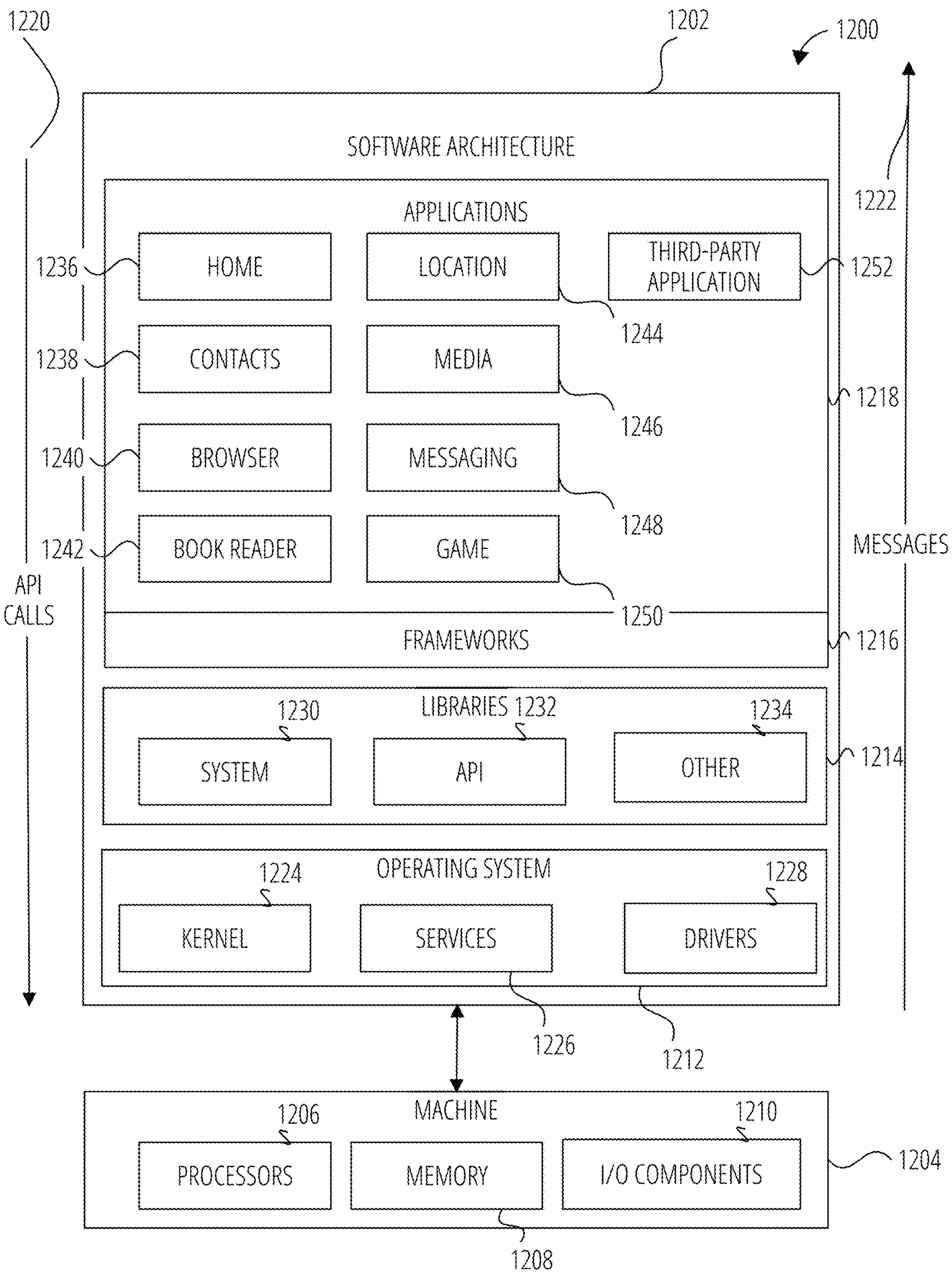
FIG. 12 is a block diagram showing a software architecture, according to some examples.

FIG. 12 is a block diagram 1200 illustrating a software architecture 1202, which can be installed on any one or more of the devices described herein. The software architecture 1202 is supported by hardware such as a machine 1204 that includes hardware processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which can be specific to a particular operating system or platform.

In an example, the applications 1218 can include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) can be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

Described implementations of the subject matter can include one or more features, alone or in combination as illustrated below by way of example:

Example 1 is a method, comprising: capturing, by one or more cameras of an extended Reality (XR) system, tracking data of a hand of a user as the user interacts with a touch surface of a mobile device; capturing, by one or more inertial motion units of the XR system, pose data of the XR system; determining a reference line segment using the tracking data and the pose data; determining 3D distances between node pairs of the hand using the reference line segment; and calculating a hand scale factor using the 3D distances between the node pairs.

In Example 2, the subject matter of Example 1 includes, using the calculated hand scale factor to enhance hand-tracking based interaction performance for the XR system.

In Example 3, the subject matter of any of Examples 1-2 includes, wherein the touch surface of the mobile device includes markers to facilitate the calculation of the reference line segment.

In Example 4, the subject matter of any of Examples 1-3 includes, wherein determining 3D distances between node pairs includes using a default set of values for node pair distances and adjusting the default set of values based on the reference line segment.

In Example 5, the subject matter of any of Examples 1-4 includes using the hand scale factor to determine a 3D hand skeleton for subsequent semantic event detection.

In Example 6, the subject matter of any of Examples 1-5 includes, wherein the capturing of the tracking data is synchronized with the capturing of the pose data.

In Example 7, the subject matter of any of Examples 1-6 includes, wherein the XR system comprises a head-wearable apparatus.

Example 8 is at least one machine-readable medium including instructions that, when executed by processing circuitry, cause the processing circuitry to perform operations to implement any of Examples 1-7.

Example 9 is an apparatus comprising means to implement any of Examples 1-7.

Example 10 is a system to implement any of Examples 1-7.

Example 11 is a method to implement any of Examples 1-7.

CONCLUSION

Changes and modifications can be made to the disclosed examples without departing from the scope of the present disclosure. These and other changes or modifications are intended to be included within the scope of the present disclosure, as expressed in the following claims.

GLOSSARY

"Carrier signal" refers to any intangible medium that is capable of storing, encoding, or carrying instructions for execution by the machine and includes digital or analog communications signals or other intangible media to facilitate communication of such instructions. Instructions can be transmitted or received over a network using a transmission medium via a network interface device.

"Client device" refers to any machine that interfaces to a communications network to obtain resources from one or more server systems or other client devices. A client device can be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user can use to access a network.

"Communication network" refers to one or more portions of a network that can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network can include a wireless or cellular network, and the coupling can be a Code Division Multiple Access (CDMA) connection, a Global System for Mobile communications (GSM) connection, or other types of cellular or wireless coupling. In this example, the coupling can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components can be combined via their interfaces with other components to carry out a machine process. A component can be a packaged functional hardware unit designed for use with other components and a part of a program that usually performs a particular function of related functions. Components can constitute either software components (e.g., code embodied on a machine-readable medium) or hardware components. A "hardware component" is a tangible unit capable of performing operations and can be configured or arranged in a physical manner. In various examples, one or more computer systems (e.g., a standalone computer system, a client computer system, or a server computer system) or one or more hardware components of a computer system (e.g., a processor or a group of processors) can be configured by software (e.g., an application or application portion) as a hardware component that operates to perform operations as described herein. A hardware component can also be implemented mechanically, electronically, or any suitable combination thereof. For example, a hardware component can include dedicated circuitry or logic that is permanently configured to perform specified operations. A hardware component can be a special-purpose processor, such as a field-programmable gate array (FPGA) or an application-specific integrated circuit (ASIC). A hardware component can also include programmable logic or circuitry that is temporarily configured by software to perform specified operations. For example, a hardware component can include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), can be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a specified manner or to perform specified operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor can be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In examples in which multiple hardware components are configured or instantiated at different times, communications between such hardware components can be achieved, for example, through the storage and retrieval of information in memory structures to which the multiple hardware components have access. For example, one hardware component can perform an operation and store the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information). The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions described herein. As used herein, "processor-implemented component" refers to a hardware component implemented using one or more processors. Similarly, the methods described herein can be at least partially processor-implemented, with a particular processor or processors being an example of hardware. For example, at least some of the operations of a method can be performed by one or more processors or processor-implemented components. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API). The performance of some of the operations can be distributed among the processors, not only residing within a single machine, but deployed across a number of machines. In some examples, the processors or processor-implemented components can be located in a single geographic location (e.g., within a home environment, an office environment, or a server farm). In other examples, the processors or processor-implemented components can be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and can be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and can be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and can be used interchangeably in this disclosure.

Changes and modifications can be made to the disclosed examples without departing from the scope of the present disclosure. These and other changes or modifications are intended to be included within the scope of the present disclosure, as expressed in the following claims.

What is claimed is:

1. A method, comprising:

synchronously capturing, by one or more tracking sensors of an extended Reality (XR) system, tracking data of a hand of a user as the user interacts with a touch surface of a device, and capturing, by one or more pose sensors of the XR system, pose data of the XR system;

receiving data indicating a length of a reference line segment defined by the interaction of the user with the touch surface of the device;

determining three-dimensional distances between node pairs of the hand using the tracking data, the pose data, and the length of the reference line segment; and calculating a hand scale factor using the three-dimensional distances between the node pairs.

2. The method of claim 1, wherein the reference line segment is defined by a first position and a second position of an identified landmark of the hand as the user makes a sliding gesture across the touch surface.

3. The method of claim 1, wherein the node pairs correspond to bones of the hand and the nodes correspond to joints of the hand.

4. The method of claim 1, wherein determining the three-dimensional distances between node pairs comprises using a default set of values for node pair distances and adjusting the default set of values based on the reference line segment.

5. The method of claim 1, further comprising using the calculated hand scale factor to predict a three-dimensional hand skeleton for subsequent semantic event detection.

6. The method of claim 1, further comprising performing an iterative process for scale estimation that converges based on bone length estimation from different gestures.

7. The method of claim 1, wherein the XR system comprises a head-wearable apparatus.

8. A machine comprising:

at least one processor; and at least one memory storing instructions that, when executed by the at least one processor, cause the machine to perform operations comprising:

synchronously capturing, by one or more tracking sensors of an extended Reality (XR) system, tracking data of a hand of a user as the user interacts with a touch surface of a device, and capturing, by one or more pose sensors of the XR system, pose data of the XR system;

receiving data indicating a length of a reference line segment defined by the interaction of the user with the touch surface of the device;

determining three-dimensional distances between node pairs of the hand using the tracking data, the pose data, and the length of the reference line segment; and calculating a hand scale factor using the three-dimensional distances between the node pairs.

9. The machine of claim 8, wherein the reference line segment is defined by a first position and a second position of an identified landmark of the hand as the user makes a sliding gesture across the touch surface.

10. The machine of claim 8, wherein the node pairs correspond to bones of the hand and the nodes correspond to joints of the hand.

11. The machine of claim 8, wherein determining the three-dimensional distances between node pairs comprises using a default set of values for node pair distances and adjusting the default set of values based on the reference line segment.

12. The machine of claim 8, wherein the operations further comprise using the calculated hand scale factor to predict a three-dimensional hand skeleton for subsequent semantic event detection.

13. The machine of claim 8, wherein the operations further comprise performing an iterative process for scale estimation that converges based on bone length estimation from different gestures.

14. The machine of claim 8, wherein the XR system comprises a head-wearable apparatus.

15. A machine-storage medium including instructions that, when executed by a machine, cause the machine to perform operations comprising:

synchronously capturing, by one or more tracking sensors of an extended Reality (XR) system, tracking data of a hand of a user as the user interacts with a touch surface of a device, and capturing, by one or more pose sensors of the XR system, pose data of the XR system;

receiving data indicating a length of a reference line segment defined by the interaction of the user with the touch surface of the device;

determining three-dimensional distances between node pairs of the hand using the tracking data, the pose data, and the length of the reference line segment; and calculating a hand scale factor using the three-dimensional distances between the node pairs.

16. The machine-storage medium of claim 15, wherein the reference line segment is defined by a first position and a second position of an identified landmark of the hand as the user makes a sliding gesture across the touch surface.

17. The machine-storage medium of claim 15, wherein the node pairs correspond to bones of the hand and the nodes correspond to joints of the hand.

18. The machine-storage medium of claim 15, wherein determining the three-dimensional distances between node pairs comprises using a default set of values for node pair distances and adjusting the default set of values based on the reference line segment.

19. The machine-storage medium of claim 15, wherein the operations further comprise using the calculated hand scale factor to predict a three-dimensional hand skeleton for subsequent semantic event detection.

20. The machine-storage medium of claim 15, wherein the operations further comprise performing an iterative process for scale estimation that converges based on bone length estimation from different gestures.

* * * * *